United States Patent
Fyffe et al.

(10) Patent No.: US 11,092,711 B2
(45) Date of Patent: Aug. 17, 2021

(54) SYSTEMS AND METHODS TO CONTROL A MOVING UNDERWATER VEHICLE RETRIEVING AN OCEAN BOTTOM SEISMIC DATA ACQUISITION UNIT

(71) Applicant: Fairfield Industries Incorporated, Houston, TX (US)

(72) Inventors: Roger L. Fyffe, Sugar Land, TX (US); Etienne Marc, Houston, TX (US); Chance Mann, Houston, TX (US)

(73) Assignee: FAIRFIELD INDUSTRIES INCORPORATED, Houston, TX (US)

(*) Notice: Subject to any disclaimer, the term of this patent is extended or adjusted under 35 U.S.C. 154(b) by 459 days.

(21) Appl. No.: 16/153,258

(22) Filed: Oct. 5, 2018

(65) Prior Publication Data
US 2020/0110189 A1   Apr. 9, 2020

(51) Int. Cl.
*G01V 1/38*   (2006.01)
*B63G 8/00*   (2006.01)

(52) U.S. Cl.
CPC ........... *G01V 1/3852* (2013.01); *B63G 8/001* (2013.01); *B63G 2008/004* (2013.01); *B63G 2008/007* (2013.01)

(58) Field of Classification Search
CPC .............. G01V 1/3852; B63G 8/001; B63G 2008/004; B63G 2008/007
See application file for complete search history.

(56) References Cited

U.S. PATENT DOCUMENTS 6,474,254 B1   11/2002   Ambs et al.
8,075,226 B2 *  12/2011   Thompson ............. B63B 22/00
                                                         405/190
(Continued)

FOREIGN PATENT DOCUMENTS

EP         3364515 A1 *  8/2018   ............ H02J 7/0013
WO    WO-2017/127507       7/2017

OTHER PUBLICATIONS

International Preliminary Report on Patentability, Ch. I, for PCT Appln. Ser. No. PCT/US2019/054352 dated Apr. 15, 2021 (12 pages).
(Continued)

*Primary Examiner* — Ian J Lobo
(74) *Attorney, Agent, or Firm* — Foley & Lardner LLP

(57) ABSTRACT

Systems and methods for retrieving seismic data acquisition units from an underwater seismic survey are provided. The system includes an underwater vehicle with a base and an underwater vehicle interlocking mechanism. The underwater vehicle receives environmental information and identifies a seismic data acquisition unit located on an ocean bottom. The underwater vehicle obtains an indication to perform a non-landing retrieval operation. The underwater vehicle sets a position of the underwater vehicle interlocking mechanism to extend away from the base of the underwater vehicle. The underwater vehicle retrieves the seismic data acquisition unit by coupling the underwater vehicle interlocking mechanism with a seismic data acquisition unit interlocking mechanism. The underwater vehicle stores the seismic data acquisition unit and then sets the underwater vehicle interlocking mechanism in a second position to perform the non-landing retrieval operation for a second seismic data acquisition unit.

20 Claims, 15 Drawing Sheets

(56) References Cited

U.S. PATENT DOCUMENTS

| | | |
|---|---|---|
| 2006/0159524 A1 | 7/2006 | Thompson et al. |
| 2014/0341584 A1 | 11/2014 | Hopewell et al. |
| 2015/0316675 A1* | 11/2015 | Brizard .................... G01V 1/18 405/209 |
| 2016/0121983 A1* | 5/2016 | Rokkan .................. B63G 8/001 114/313 |
| 2016/0370485 A1 | 12/2016 | Pichot |
| 2017/0203815 A1* | 7/2017 | Dudley ................ G01V 1/3843 |
| 2017/0285203 A1 | 10/2017 | Fyffe et al. |
| 2018/0052246 A1* | 2/2018 | Hartland .............. G01V 1/3852 |
| 2018/0162503 A1* | 6/2018 | Reid .................... G01V 1/3843 |
| 2018/0222560 A1* | 8/2018 | Postic ................... B63G 8/001 |

OTHER PUBLICATIONS

International Search Report and Written Opinion for PCT/US2019/054352 dated Dec. 17, 2019 (19 pages).

* cited by examiner

SYSTEMS AND METHODS TO CONTROL A MOVING UNDERWATER VEHICLE RETRIEVING AN OCEAN BOTTOM SEISMIC DATA ACQUISITION UNIT

BACKGROUND

Seismic data may be evaluated to obtain information about subsurface features. The information can indicate geological profiles of a subsurface portion of earth, such as salt domes, bedrock, or stratigraphic traps, and can be interpreted to indicate a possible presence or absence of minerals, hydrocarbons, metals, or other elements or deposits.

SUMMARY

Performing an ocean bottom seismic survey to detect the presence or absence of minerals, hydrocarbons, metals, or other elements or deposits can include placing ocean bottom seismic data acquisition units on the ocean bottom or seabed. Depending on the size of the survey, hundreds, thousands or more seismic data acquisition units can be placed at specific, predetermined positions on the ocean bottom. However, due to the large size of the seismic survey and the large number of seismic data acquisition units being deployed, it can be challenging to efficiently deploy and retrieve the large number of seismic data acquisition units at the specified locations without excessive resource consumption or utilization. For example, as the number of seismic data acquisition units being deployed increases, then the amount of energy, battery resources, or fuel consumed or utilized by the underwater vehicle deploying, placing, or retrieving the seismic data acquisitions also increases. Furthermore, as the amount of time taken to deploy the seismic data acquisition units increases, then the amount of resources consumed by a marine vessel can also increase. Similarly, as the number of data acquisition units to be retrieved increases, the overall resource consumption increase. Thus, it can be technically challenging to perform increasingly larger seismic surveys in an energy efficient and time efficient manner due to the increased amount of time and resources utilized or consumed by the underwater vehicle deploying and retrieving the seismic data acquisition units.

Systems and methods of the present technical solution provide an underwater vehicle that can deploy or retrieve seismic data acquisition units in time and energy efficient manner. For example, the underwater vehicle of the present technical solution can use one or more sensors to collect environmental information and determine a launch event for the seismic data acquisition unit, and then discharge the seismic data acquisition unit from the underwater vehicle without landing on the seabed or without slowing down to zero velocity. By discharging seismic data acquisition units without landing or without slowing down to zero velocity, the underwater vehicle can reduce the amount of time taken to deploy seismic data acquisition units used to perform the seismic survey, thereby reducing the amount of resources consumed by the underwater vehicle, the marine vessel, or the seismic data acquisition units themselves as the operation time can be reduced.

The underwater vehicle can collect environmental information and based on a policy retrieve seismic data acquisition units from the seabed in a non-landing operation. The underwater vehicle can use interlocking mechanisms to retrieve the deployed seismic data acquisition units without having to land the underwater vehicle on the seabed. By retrieving seismic data acquisition units without landing, the underwater vehicle can reduce the amount of time taken to retrieve seismic data acquisition units used to perform the seismic survey, thereby reducing the amount of resources consumed by the underwater vehicle, the marine vessel, or the seismic data acquisition units themselves as the operation time can be reduced.

At least one aspect of the present technical solution is directed to a method for delivering seismic data acquisition units to an ocean bottom. The method can include an underwater vehicle receiving environmental information. The underwater vehicle can be located in an aqueous medium. The method can include the underwater vehicle obtaining, based on the environmental information and a policy, an indication to perform a fly-by deployment. The method can include setting, responsive to the determination to perform the fly-by deployment and based on the environmental information, an angle of a ramp with respect to a base of the underwater vehicle. The ramp can have a first end and a second end. The first end of the ramp can be positioned closer to the base of the underwater vehicle than the second end. The method can include the underwater identifying a launch event for a seismic data acquisition unit of the plurality of seismic data acquisition units stored in the underwater vehicle. The method can include the underwater vehicle deploying the seismic data acquisition unit from the second end of the ramp towards the ocean bottom based on the identification of the launch event and the environmental information.

The underwater vehicle can include a remote operated vehicle tethered to a vessel. The underwater vehicle can include an autonomous underwater vehicle absent a tether to a vessel. The method can include determining, by a control unit external and remote from the underwater vehicle, to perform the fly-by deployment, and transmitting, by the control unit, the indication to the underwater vehicle.

The method can include moving, by the underwater vehicle in the aqueous medium, with a non-zero velocity having a horizontal component with a first magnitude in a first direction. The method can include setting the angle of the ramp with respect to a base of the underwater vehicle to result in deployment of the seismic data acquisition unit from the second end of the ramp with a velocity having a horizontal component with zero magnitude in a second direction, the second direction being opposite the first direction.

The method can include the underwater vehicle deploying the seismic data acquisition unit via the ramp while moving with a first velocity having a horizontal component with a first magnitude and a first direction. The first velocity can correspond to a travel velocity between subsequent seismic data acquisition unit drop locations. The method can include the underwater vehicle deploying the seismic data acquisition unit via the ramp while hovering over the ocean bottom. The environmental information can include at least one of a velocity of the underwater vehicle, an elevation of the underwater vehicle, a turbidity of the aqueous medium, a current of the aqueous medium, a temperature of the aqueous medium, a topography of the ocean bottom, a composition of the ocean bottom, or a presence of marine life or growths.

The method can includes receiving the environmental information via one or more sensors comprising at least one of a visual sensor, an audio sensor, an accelerometer, sonar, radar, or lidar. The method can include determining to perform the fly-by deployment responsive to detecting an absence of marine life at the ocean bottom. The method can include determining, for the seismic data acquisition unit, to perform the fly-by deployment responsive to detecting a current of the aqueous medium below a current threshold. The method can include blocking, for a second seismic data acquisition unit, the fly-by deployment responsive to detecting a level of visibility below a visibility threshold, and landing, by the underwater vehicle responsive to the blocking of the fly-by deployment, on the ocean bottom to deploy the second seismic data acquisition unit. The method can include blocking, for a second seismic data acquisition unit, the fly-by deployment responsive to detection of an obstruction, and performing, by the underwater vehicle, an emergency stopping process using multiple reverse facing thrusters.

The method can include setting a yaw angle of the ramp based on a forward velocity of the underwater vehicle, a current of the aqueous medium, and a friction coefficient of the ramp. In some embodiments, the ramp corresponds to at least a portion of a helix structure, and the angle corresponds to an orientation angle of the helix structure. The ramp can include a powered ramp.

The method can include identifying the launch event based on a location or a timing function, wherein the location corresponds to one of a target location for the seismic data acquisition unit on the ocean bottom or a location of the underwater vehicle when the seismic data acquisition unit is deployed.

At least one aspect of the present technical solution is directed to a system to deliver a plurality of seismic data acquisition units to an ocean bottom. The system can include an underwater vehicle located in an aqueous medium. The underwater vehicle can include one or more sensors to determine environmental information. The system can include a control unit (e.g., a deployment control unit) executed by one or more processors to obtain, based on the environmental information and a policy, an indication to perform a fly-by deployment. The control unit can set, responsive to the determination to perform the fly-by deployment and based on the environmental information, an angle of a ramp with respect to a base of the underwater vehicle. The ramp can have a first end and a second end. The first end of the ramp can be positioned closer to the base of the underwater vehicle than the second end. The control unit can identify a launch event for a seismic data acquisition unit of a plurality of seismic data acquisition units stored in the underwater vehicle. The control unit can deploy the seismic data acquisition unit from the second end of the ramp towards the ocean bottom based on the identification of the launch event and the environmental information.

The underwater vehicle can include a remote operated vehicle tethered to a vessel or an autonomous underwater vehicle absent a tether to a vessel. The system can include an external control unit remote from the underwater vehicle to determine to perform the fly-by deployment, and transmit the indication to the deployment control unit of the underwater vehicle.

The control unit can move the underwater vehicle with a non-zero velocity having a horizontal component with a first magnitude in a first direction. The control unit can set the angle of the ramp with respect to the base of the underwater vehicle to result in deployment of the seismic data acquisition unit from the second end of the ramp with a velocity having a horizontal component with zero magnitude in a second direction, the second direction being opposite the first direction.

At least one aspect of the present technical solution is directed to a method for retrieving seismic data acquisition units from an underwater seismic survey. The method can include providing, in an aqueous medium, an underwater vehicle comprising a base and an underwater vehicle interlocking mechanism coupled with the base. The method can include the underwater vehicle receiving environmental information. The method can include the underwater vehicle identifying a seismic data acquisition unit located on an ocean bottom, the seismic data acquisition unit having a seismic data acquisition unit interlocking mechanism. The method can include the underwater vehicle obtaining, based on the environmental information and a policy, an indication to perform a non-landing retrieval operation. The non-landing retrieval operation can include moving, without landing the underwater vehicle on the ocean bottom, seismic data acquisition units from the ocean bottom to a storage container. The seismic data acquisition units can store seismic data indicative of subsurface lithological formations or hydrocarbons. The method can include setting, responsive to the indication to perform the non-landing retrieval operation and based on the environmental information and a location of the identified seismic data acquisition unit, a position of the underwater vehicle interlocking mechanism to extend away from the base of the underwater vehicle. The method can include the underwater vehicle retrieving, in performance of the non-landing retrieval operation, the seismic data acquisition unit by coupling the underwater vehicle interlocking mechanism with the seismic data acquisition unit interlocking mechanism. The method can include the underwater vehicle storing the seismic data acquisition unit in the storage container. The method can include the underwater vehicle setting the underwater vehicle interlocking mechanism in a second position to perform the non-landing retrieval operation for a second seismic data acquisition unit.

The underwater vehicle can include or refer to a remote operated vehicle tethered to a vessel. The underwater vehicle can include or refer to an autonomous underwater vehicle absent (or lacking) a tether to a vessel. The method can include determining, by a control unit external and remote from the underwater vehicle, to perform the non-landing retrieval operation. The method can include the control unit transmitting the indication to the underwater vehicle. The method can include the underwater vehicle retrieving the seismic data acquisition unit by coupling the seismic data acquisition unit interlocking mechanism with the underwater vehicle interlocking mechanism of the seismic data acquisition unit the while hovering over the ocean bottom. The environmental information can include at least one of a velocity of the underwater vehicle, an elevation of the underwater vehicle, a turbidity of the aqueous medium, a current of the aqueous medium, a temperature of the aqueous medium, a topography of the ocean bottom, a composition of the ocean bottom, or a presence of marine life or growths.

The method can include receiving the environmental information via one or more sensors comprising at least one of a visual sensor, an audio sensor, an accelerometer, sonar, radar, or lidar. The method can include determining to perform the non-landing retrieval operation responsive to detecting an absence of marine life at the ocean bottom. The method can include determining, for the seismic data acquisition unit, to perform the non-landing retrieval operation responsive to detecting a current of the aqueous medium below a current threshold. The method can include blocking, for a third seismic data acquisition unit, the non-landing retrieval operation responsive to detecting a level of visibility below a visibility threshold. The method can include landing, by the underwater vehicle responsive to the blocking of the non-landing retrieval operation, on the ocean bottom to retrieve the third seismic data acquisition unit.

The method can include blocking, for a third seismic data acquisition unit, the non-landing retrieval operation responsive to detection of an obstruction. The method can include the underwater vehicle performing an emergency stopping process using multiple reverse facing thrusters. The underwater vehicle can include a robotic arm coupled to the seismic data acquisition unit interlocking mechanism. The method can include setting an angle of the robotic arm to position the seismic data acquisition unit interlocking mechanism to retrieve the seismic data acquisition unit based on the environmental information and the location of the identified seismic data acquisition unit.

The underwater vehicle interlocking mechanism can have a positive buoyancy in the aqueous medium. The method can include detecting that the underwater vehicle is within a threshold distance from the seismic data acquisition unit. The method can include extending, by a telescoping mechanism of the seismic data acquisition unit responsive to the detecting that the underwater vehicle is within the threshold distance from the seismic data acquisition unit, the underwater vehicle interlocking mechanism towards the seismic data acquisition unit interlocking mechanism of the underwater vehicle.

The method can include detecting that the underwater vehicle is within a threshold distance from the seismic data acquisition unit. The method can include activating the underwater vehicle interlocking mechanism to couple with the seismic data acquisition unit interlocking mechanism. Subsequent to retrieval of the seismic data acquisition unit by the underwater vehicle, the method can include deactivating the underwater vehicle interlocking mechanism.

The method can include determining the location of the seismic data acquisition unit using an acoustic beacon. The underwater vehicle interlocking mechanism can be mechanically decoupled from the seismic data acquisition unit. The seismic data acquisition unit interlocking mechanism can include at least one of a hook or a clamp.

The method can include identifying, by the underwater vehicle, an object on the ocean bottom. The method can include determining, based on a seismic data acquisition unit detection policy, not to retrieve the object. Subsequent to retrieving the seismic data acquisition unit, the method can include the underwater vehicle traveling at a first speed and identifying the second seismic data acquisition unit on the ocean bottom. The method can include the underwater vehicle reducing, prior to retrieval of the second seismic data acquisition unit, a speed of the underwater vehicle to a second speed subsequent to retrieving the second seismic data acquisition unit. The method can include the underwater vehicle traveling at the first speed, the first speed greater than the second speed.

At least one aspect of the present technical solution is directed to a system. The system can include an underwater vehicle located in an aqueous medium. The underwater vehicle can include a base, an underwater vehicle interlocking mechanism coupled with the base, one or more sensors to determine environmental information, and a retrieval control unit executed by one or more processors. The retrieval control unit can identify a seismic data acquisition unit located on an ocean bottom. The seismic data acquisition unit can be coupled with a seismic data acquisition unit interlocking mechanism. The retrieval control unit can obtain, based on the environmental information and a policy, an indication to perform a non-landing retrieval operation. The non-landing retrieval operation can include moving, without landing the underwater vehicle on the ocean bottom, seismic data acquisition units from the ocean bottom to a storage container. The seismic data acquisition units can store seismic data indicative of subsurface lithological formations or hydrocarbons. The retrieval control unit can (e.g., via one or more instructions or commands) set, responsive to the indication to perform the non-landing retrieval operation and based on the environmental information and a location of the identified seismic data acquisition unit, a position of the underwater vehicle interlocking mechanism to extend away from the base of the underwater vehicle. The retrieval control unit can (e.g., via one or more instructions or commands) couple, in performance of the non-landing retrieval operation, the underwater vehicle interlocking mechanism with the seismic data acquisition unit interlocking mechanism to retrieve the seismic data acquisition unit. The retrieval control unit can (e.g., via one or more instructions or commands) store the seismic data acquisition unit in the storage container. The retrieval control unit can (e.g., via one or more instructions or commands) set the underwater vehicle interlocking mechanism in a second position to perform the non-landing retrieval operation for a second seismic data acquisition unit.

The underwater vehicle can hover over the ocean bottom and couple the seismic data acquisition unit interlocking mechanism with the underwater vehicle interlocking mechanism of the seismic data acquisition unit to retrieve the seismic data acquisition unit.

At least one aspect of the present technical solution is directed to a method for deploying and retrieving seismic data acquisition units from an underwater seismic survey using the same underwater vehicle. The method can include obtaining by the underwater vehicle based on environmental information and a deployment policy, an indication to perform fly-by deployment. The method can include setting, responsive to the determination to perform the fly-by deployment and based on the environmental information, an angle of a ramp with respect to a base of the underwater vehicle. The ramp can have a first end and a second end. The first end of the ramp can be positioned closer to the base than the second end. The method can include identifying, by the underwater vehicle, a launch event for a seismic data acquisition unit. The method can include deploying, by the underwater vehicle, the seismic data acquisition unit from the second end of the ramp towards the ocean bottom based on the identification of the launch event and the environmental information. The method can include identifying, by the underwater vehicle, the seismic data acquisition unit deployed on the ocean bottom. The seismic data acquisition unit can have a seismic data acquisition unit interlocking mechanism. The method can include identifying, by the underwater vehicle, a seismic data acquisition unit located on an ocean bottom. The method can include obtaining, by the underwater vehicle based on the environmental information and a policy, an indication to perform a non-landing retrieval operation. The non-landing retrieval operation can include moving, without landing the underwater vehicle on the ocean bottom, seismic data acquisition units from the ocean bottom to a storage container. The method can include setting the underwater vehicle interlocking mechanism to extend away from the base to a first position. The method can include retrieving, by the underwater vehicle, the seismic data acquisition unit by coupling the underwater vehicle interlocking mechanism with the seismic data acquisition unit interlocking mechanism.

The method can include obtaining an indication to block the deployment of a second seismic data acquisition unit at a second location on the ocean bottom. The method can include storing the location where the fly-by deployment is blocked. The method can include determining to block a fly-by retrieval for the location where fly-by deployment was previously blocked, or determining to land to retrieve the seismic data acquisition unit at the location the fly-by deployment was blocked.

At least one aspect of the present technical solution is directed to a system to deploy and retrieve seismic data acquisition units from an underwater seismic survey using the same underwater vehicle. The system can include an underwater vehicle located in an aqueous medium. The underwater vehicle can include a base, an underwater vehicle interlocking mechanism coupled with the base, or one or more sensors to determine environmental information. The system can include a retrieval control unit executed by one or more processors. The system can include a deployment control unit executed by the one or more processors. In some cases, the system can include a single control unit configured to perform or generate instructions or commands to perform both fly-by deployment and fly-by retrieval operations.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims. The drawings are not intended to be drawn to scale. Like reference numbers and designations in the various drawings indicate like elements. For purposes of clarity, not every component may be labeled in every drawing. In the drawings:

DETAILED DESCRIPTION

Following below are more detailed descriptions of various concepts related to, and implementations of, methods, apparatuses, and systems for delivering seismic data acquisition units to an ocean bottom using an underwater vehicle. The various concepts introduced above and discussed in greater detail below may be implemented in any of numerous ways.

Systems, methods, and apparatus of the present technical solution generally relate to delivering seismic data acquisition units to target locations on the seabed. Where multiple seismic data acquisition units are to be delivered to multiple target locations, an underwater vehicle may have to halt at each target location to deliver a seismic data acquisition unit to the target location. With a large number of target locations, halting the underwater vehicle at each target location can considerably increase the total seismic data acquisition unit deployment time. Deploying the seismic data acquisition units while the underwater vehicle is in motion may result in imprecise positioning of the seismic data acquisition units at their respective target locations.

Thus, systems, methods and apparatus of the present technical solution can deliver the seismic data acquisition units from a moving underwater vehicle with a zero (or near zero, such as 0.1 knots, 0.2 knots, 0.3 knots, 0.4 knots, 0.5 knots, 1 knot, or 1.5 knots or less) horizontal velocity with respect to the seabed, which causes the seismic data acquisition units to drop substantially straight down (e.g., within plus or minus 20 degrees of straight down) to the target location without any horizontal displacement, thereby improving the precision with which the seismic data acquisition units can be delivered. The seismic data acquisition units can be launched with a horizontal velocity component that is equal in magnitude to the magnitude of a horizontal velocity component of the underwater vehicle. Further, the direction of the horizontal velocity of the seismic data acquisition unit at the time of launch is opposite to the direction of the horizontal component of the velocity of the underwater vehicle. This can result in zero or near zero horizontal velocity of the seismic data acquisition unit when it is launched from the underwater vehicle. Thus, the seismic data acquisition unit can be precisely dropped on the target location by ensuring that the underwater vehicle is located above the target location at the time of launch.

Figure 1:
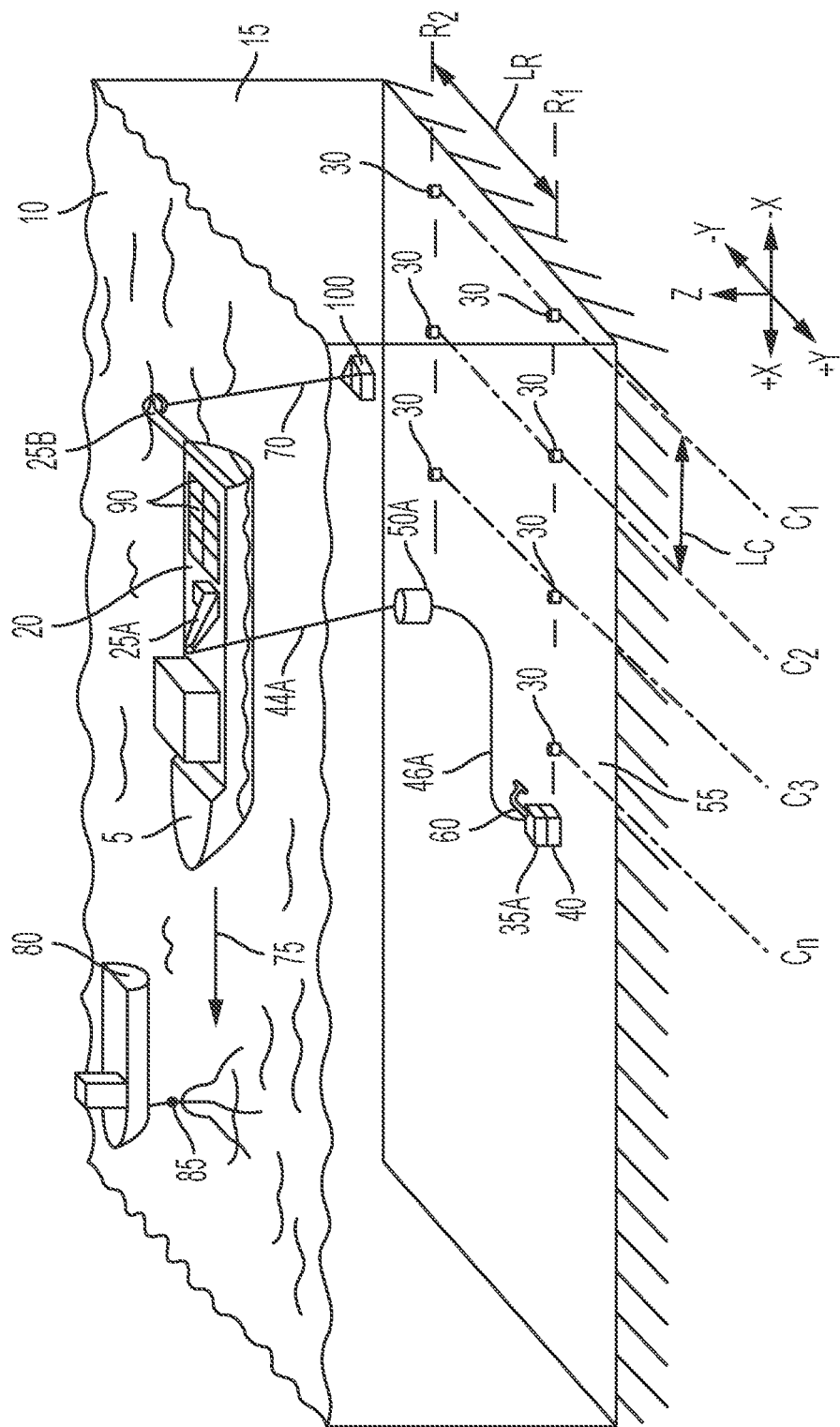
FIG. 1 is an isometric schematic view of an embodiment of a seismic operation in deep water.

Referring to FIG. 1, among others, an isometric schematic view of an embodiment of a seismic operation in deep water facilitated by a first marine vessel 5 is shown. A data processing system can obtain the seismic data via the seismic operation in order to process the seismic data to detect or generate images indicating the presence or absence of minerals, hydrocarbons, lithologic formations, metals, or other elements or deposits. While this figure illustrates a deep water seismic operation, the systems and methods described herein can use seismic data obtained via streamer data, land-based seismic operations. In this example, the first vessel 5 is positioned on a surface 10 of a water column 15 (also referred to as an "aqueous medium") and includes a deck 20 which supports operational equipment. At least a portion of the deck 20 includes space for a plurality of sensor device racks 90 where seismic sensor devices (or seismic data acquisition units or seismic data acquisition units) are stored. The sensor device racks 90 may also include data retrieval devices or sensor recharging devices.

The deck 20 also includes one or more cranes 25A, 25B attached thereto to facilitate transfer of at least a portion of the operational equipment, such as an autonomous underwater vehicle (AUV), autonomously operated vehicle (AOV), a remotely operated underwater vehicle (ROV) or seismic sensor devices, from the deck 20 to the water column 15. For example, a crane 25A coupled to the deck 20 is configured to lower and raise an underwater vehicle (e.g., ROV 35A, AUV or AOV), which transfers and positions one or more sensor devices 30 (e.g., ocean bottom seismometer "OBS" units, seismic data acquisition units, or seismic data acquisition units) on a seabed 55. The ROV 35A can be coupled to the first vessel 5 by a tether 46A and an umbilical cable 44A that provides power, communications, and control to the ROV 35A. A tether management system (TMS) 50A is also coupled between the umbilical cable 44A and the tether 46A. Generally, the TMS 50A may be utilized as an intermediary, subsurface platform from which to operate the ROV 35A. For most ROV 35A operations at or near the seabed 55, the TMS 50A can be positioned approximately 50 feet above seabed 55 and can pay out tether 46A as needed for ROV 35A to move freely above seabed 55 in order to position and transfer seismic sensor devices 030 thereon. The seabed 55 can include or refer to a continental shelf.

A crane 25B may be coupled (e.g., via a latch, anchor, nuts and bolts, screw, suction cup, magnet, or other fastener.) to a stern of the first vessel 5, or other locations on the first vessel 5. Each of the cranes 25A, 25B may be any lifting device or launch and recovery system (LARS) adapted to operate in a marine environment. The crane 25B may be coupled to a seismic sensor transfer device 100 by a cable 70. The transfer device 100 may be a drone, a skid structure, a basket, or any device capable of housing one or more sensor devices 30 therein. The transfer device 100 may be a structure configured as a magazine adapted to house and transport one or more sensor devices 30. The transfer device 100 may be configured as a sensor device storage rack for transfer of sensor devices 30 from the first vessel 5 to the ROV 35A, and from the ROV 35A to the first vessel 5. The transfer device 100 may include an on-board power supply, a motor or gearbox, or a propulsion system. In some embodiments, the transfer device 100 may not include any integral power devices or not require any external or internal power source. In some embodiments, the cable 70 may provide power or control to the transfer device 100. In some embodiments, the transfer device 100 can operate without external power or control. In some embodiments, the cable 70 may include an umbilical, a tether, a cord, a wire, a rope, and the like, that is configured to support, tow, position, power or control the transfer device 100.

The ROV 35A can include a seismic sensor device storage compartment 40 that is configured to store one or more seismic sensor devices 30 therein for a deployment or retrieval operation. The storage compartment 40 may include a magazine, a rack, or a container configured to store the seismic sensor devices. The storage compartment 40 may also include a conveyor, such as a movable platform having the seismic sensor devices thereon, such as a carousel or linear platform configured to support and move the seismic sensor devices 30 therein. In one embodiment, the seismic sensor devices 30 may be deployed on the seabed 55 and retrieved therefrom by operation of the movable platform. The ROV 35A may be positioned at a predetermined location above or on the seabed 55 and seismic sensor devices 30 are rolled, conveyed, or otherwise moved out of the storage compartment 40 at the predetermined location. In some embodiments, the seismic sensor devices 30 may be deployed and retrieved from the storage compartment 40 by a robotic device 60, such as a robotic arm, an end effector or a manipulator, disposed on the ROV 35A.

The seismic sensor device 30 may be referred to as seismic data acquisition unit 30 or seismic data acquisition unit 30. The seismic data acquisition unit 30 can record seismic data. The seismic data acquisition unit 30 may include one or more of at least one geophone, at least one power source (e.g., a battery, external solar panel), at least one clock, at least one tilt meter, at least one environmental sensor, at least one seismic data recorder, at least global positioning system sensor, at least one wireless or wired transmitter, at least one wireless or wired receiver, at least one wireless or wired transceiver, or at least one processor. The seismic sensor device 30 may be a self-contained unit such that all electronic connections are within the unit. During recording, the seismic sensor device 30 may operate in a self-contained manner such that the seismic data acquisition unit does not require external communication or control. The seismic sensor device 30 may include several geophones configured to detect acoustic waves that are reflected by subsurface lithological formation or hydrocarbon deposits. The seismic sensor device 30 may further include one or more geophones that are configured to vibrate the seismic sensor device 30 or a portion of the seismic sensor device 30 in order to detect a degree of coupling between a surface of the seismic sensor device 30 and a ground surface. One or more component of the seismic sensor device 30 may attach to a gimbaled platform having multiple degrees of freedom. For example, the clock may be attached to the gimbaled platform to minimize the effects of gravity on the clock.

For example, in a deployment operation, a first plurality of seismic sensor devices, comprising one or more sensor devices 30, may be loaded into the storage compartment 40 while on the first vessel 5 in a pre-loading operation. The ROV 35A, having the storage compartment coupled thereto, is then lowered to a subsurface position in the water column 15. The ROV 35A can utilize commands from personnel on the first vessel 5 to operate along a course to transfer the first plurality of seismic sensor devices 30 from the storage compartment 40 and deploy the individual sensor devices 30 at selected locations on the seabed 55 or ground surface 55 or sea floor 55 or earth surface 55 in a land based deployment. Once the storage compartment 40 is depleted of the first plurality of seismic sensor devices 30, the transfer device 100 (or transfer system 100) can be used to ferry a second plurality of seismic sensor devices 30 as a payload from first vessel 5 to the ROV 35A.

The transfer system 100 may be preloaded with a second plurality of seismic sensor devices 30 while on or adjacent the first vessel 5. When a suitable number of seismic sensor devices 30 are loaded onto the transfer device 100, the transfer device 100 may be lowered by crane 25B to a selected depth in the water column 15. The ROV 35A and transfer device 100 are mated at a subsurface location to allow transfer of the second plurality of seismic sensor devices 30 from the transfer device 100 to the storage compartment 40. When the transfer device 100 and ROV 35A are mated, the second plurality of seismic sensor devices 30 contained in the transfer device 100 are transferred to the storage compartment 40 of the ROV 35A. Once the storage compartment 40 is reloaded, the ROV 35A and transfer device 100 are detached or unmated and seismic sensor device placement by ROV 35A may resume. In one embodiment, reloading of the storage compartment 40 is provided while the first vessel 5 is in motion. If the transfer device 100 is empty after transfer of the second plurality of seismic sensor devices 30, the transfer device 100 may be raised by the crane 25B to the vessel 5 where a reloading operation replenishes the transfer device 100 with a third plurality of seismic sensor devices 30. The transfer device 100 may then be lowered to a selected depth when the storage compartment 40 needs to be reloaded. This process may repeat as needed until a desired number of seismic sensor devices 30 have been deployed.

Using the transfer device 100 to reload the ROV 35A at a subsurface location reduces the time required to place the seismic sensor devices 30 on the seabed 55, or "planting" time, as the ROV 35A is not raised and lowered to the surface 10 for seismic sensor device reloading. Further, mechanical stresses placed on equipment utilized to lift and lower the ROV 35A are minimized as the ROV 35A may be operated below the surface 10 for longer periods. The reduced lifting and lowering of the ROV 35A may be particularly advantageous in foul weather or rough sea conditions. Thus, the lifetime of equipment may be enhanced as the ROV 35A and related equipment are not raised above surface 10, which may cause the ROV 35A and related equipment to be damaged, or pose a risk of injury to the vessel personnel.

Likewise, in a retrieval operation, the ROV 35A can utilize commands from personnel on the first vessel 5 to retrieve each seismic sensor device 30 that was previously placed on seabed 55. The retrieved seismic sensor devices 30 are placed into the storage compartment 40 of the ROV 35A. In some embodiments, the ROV 35A may be sequentially positioned adjacent each seismic sensor device 30 on the seabed 55 and the seismic sensor devices 30 are rolled, conveyed, or otherwise moved from the seabed 55 to the storage compartment 40. In some embodiments, the seismic sensor devices 30 may be retrieved from the seabed 55 by a robotic device 60 disposed on the ROV 35A.

Once the storage compartment 40 is full or contains a pre-determined number of seismic sensor devices 30, the transfer device 100 can be lowered to a position below the surface 10 and mated with the ROV 35A. The transfer device 100 may be lowered by crane 25B to a selected depth in the water column 15, and the ROV 35A and transfer device 100 are mated at a subsurface location. Once mated, the retrieved seismic sensor devices 30 contained in the storage compartment 40 are transferred to the transfer device 100. Once the storage compartment 40 is depleted of retrieved sensor devices, the ROV 35A and transfer device 100 are detached and sensor device retrieval by ROV 35A may resume. Thus, the transfer device 100 can ferry the retrieved seismic sensor devices 30 as a payload to the first vessel 5, allowing the ROV 35A to continue collection of the seismic sensor devices 30 from the seabed 55. In this manner, sensor device retrieval time is significantly reduced as the ROV 35A is not raised and lowered for sensor device unloading. Further, mechanical stresses placed on equipment related to the ROV 35A are minimized as the ROV 35A may be subsurface for longer periods.

In this embodiment, the first vessel 5 may travel in a first direction 75, such as in the +X direction, which may be a compass heading or other linear or predetermined direction. The first direction 75 may also account for or include drift caused by wave action, current(s) or wind speed and direction. In one embodiment, the plurality of seismic sensor devices 30 are placed on the seabed 55 in selected locations, such as a plurality of rows Rn in the X direction (R1 and R2 are shown) or columns Cn in the Y direction (C1, C2, C3, and C4 are shown), wherein n equals an integer. In one embodiment, the rows Rn and columns Cn define a grid or array, wherein each row Rn comprises a receiver line in the width of a sensor array (X direction) or each column Cn comprises a receiver line in a length of the sensor array (Y direction). The distance between adjacent sensor devices 30 in the rows is shown as distance LR and the distance between adjacent sensor devices 30 in the columns is shown as distance LC. While a substantially square pattern is shown, other patterns may be formed on the seabed 55. Other patterns include non-linear receiver lines or non-square patterns. The pattern(s) may be pre-determined or result from other factors, such as topography of the seabed 55. In some embodiments, the distances LR and LC may be substantially equal (e.g., plus or minus 10% of each other) and may include dimensions between about 60 meters to about 400 meters. In some embodiments, the distances LR and LC may be different. In some embodiments, the distances LR or LC may include dimensions between about 400 meters to about 1100 meters. The distance between adjacent seismic sensor devices 30 may be predetermined or result from topography of the seabed 55 as described above.

The first vessel 5 is operated at a speed, such as an allowable or safe speed for operation of the first vessel 5 and any equipment being towed by the first vessel 5. The speed may take into account any weather conditions, such as wind speed and wave action, as well as currents in the water column 15. The speed of the vessel may also be determined by any operations equipment that is suspended by, attached to, or otherwise being towed by the first vessel 5. For example, the speed is typically limited by the drag coefficients of components of the ROV 35A, such as the TMS 50A and umbilical cable 44A, as well as any weather conditions or currents in the water column 15. As the components of the ROV 35A are subject to drag that is dependent on the depth of the components in the water column 15, the first vessel speed may operate in a range of less than about 1 knot. For example, when two receiver lines (rows R1 and R2) are being laid, the first vessel includes a first speed of between about 0.2 knots and about 0.6 knots. In some embodiments, the first speed includes an average speed of between about 0.25 knots, which includes intermittent speeds of less than 0.25 knots and speeds greater than about 1 knot, depending on weather conditions, such as wave action, wind speeds, or currents in the water column 15.

During a seismic survey, one receiver line, such as row R1 may be deployed. When the single receiver line is completed a second vessel 80 can be used to provide a source signal. The second vessel 80 can be provided with a source device 85, which may be a device capable of producing acoustical signals or vibrational signals suitable for obtaining the survey data. The source signal propagates to the seabed 55 and a portion of the signal is reflected back to the seismic sensor devices 30. The second vessel 80 may be required to make multiple passes, for example at least four passes, per a single receiver line (row R1 in this example). During the time the second vessel 80 is making the passes, the first vessel 5 continues deployment of a second receiver line. However, the time involved in making the passes by the second vessel 80 can be shorter than the deployment time of the second receiver line. This causes a lag time in the seismic survey as the second vessel 80 sits idle while the first vessel 5 is completing the second receiver line.

In some embodiments, the first vessel 5 can utilize an ROV 35A to lay sensor devices to form a first set of two receiver lines (rows R1 and R2) in any number of columns, which may produce a length of each receiver line of up to and including several miles. The two receiver lines (rows R1 and R2) can be substantially parallel, e.g. within +/−20 degrees of parallel. When a single directional pass of the first vessel 5 is completed and the first set (rows R1, R2) of seismic sensor devices 30 are laid to a predetermined length, the second vessel 80, provided with the source device 85, is utilized to provide the source signal. The second vessel 80 may make eight or more passes along the two receiver lines to complete the seismic survey of the two rows R1 and R2.

While the second vessel 80 is shooting along the two rows R1 and R2, the first vessel 5 may turn 180 degrees and travel in the −X direction in order to lay seismic sensor devices 30 in another two rows adjacent the rows R1 and R2, thereby forming a second set of two receiver lines. The second vessel 80 may then make another series of passes along the second set of receiver lines while the first vessel 5 turns 180 degrees to travel in the +X direction to lay another set of receiver lines. The process may repeat until a specified area of the seabed 55 has been surveyed. Thus, the idle time of the second vessel 80 is minimized as the deployment time for laying receiver lines is cut approximately in half by deploying two rows in one pass of the vessel 5.

Although only two rows R1 and R2 are shown, the sensor device 30 layout is not limited to this configuration as the ROV 35A may be adapted to layout more than two rows of sensor devices in a single directional tow. For example, the ROV 35A may be controlled to lay out between three and six rows of sensor devices 30, or an even greater number of rows in a single directional tow. The width of a "one pass" run of the first vessel 5 to layout the width of the sensor array is typically limited by the length of the tether 46A or the spacing (distance LR) between sensor devices 30.

Figure 2:
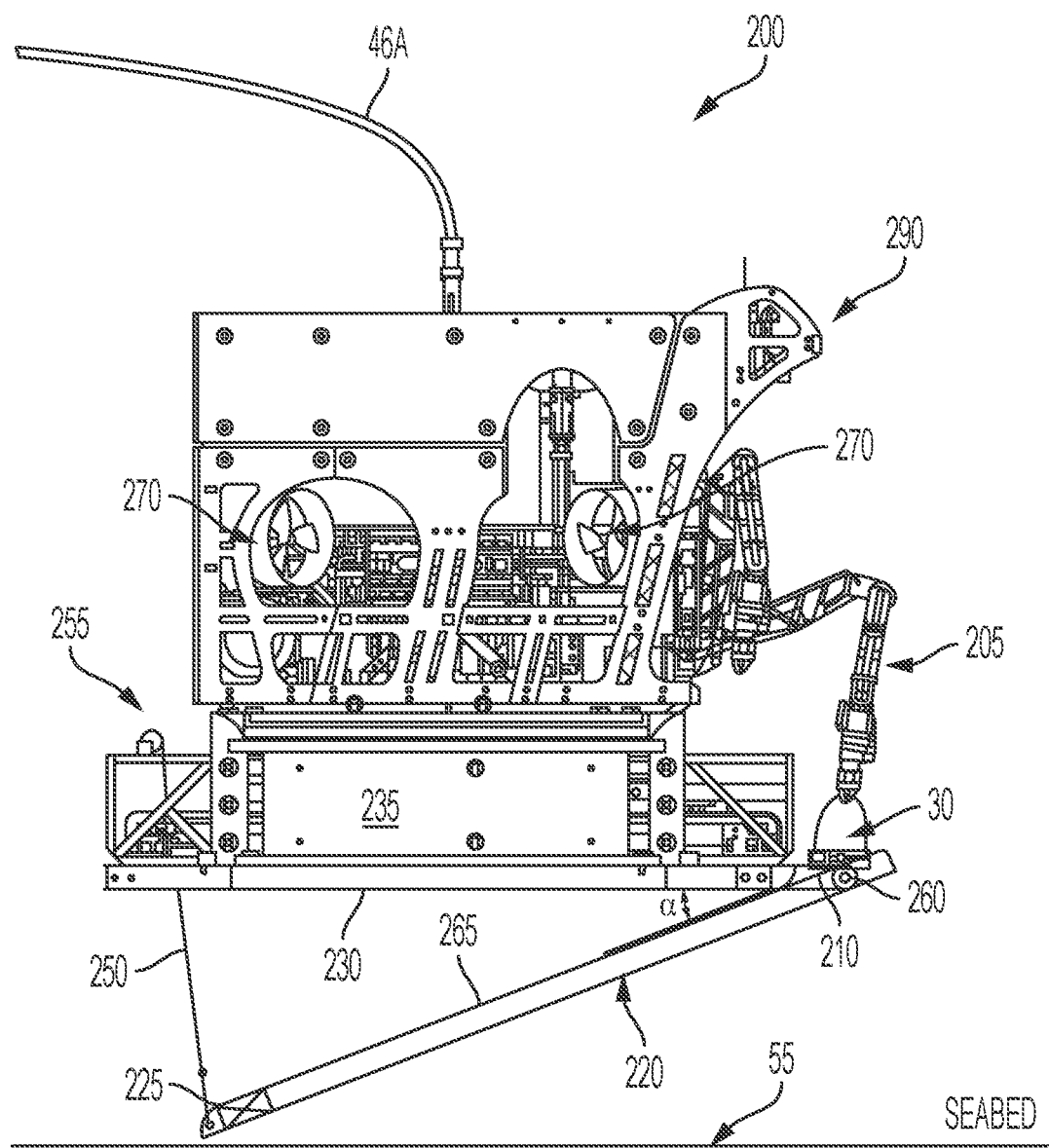
FIG. 2 illustrates a system to deliver seismic data acquisition units in accordance with an embodiment.

FIG. 2 is a system for acquiring seismic data in accordance with an embodiment. The system 200 can include an underwater vehicle 290. The underwater vehicle 290 can include one or more system, component or functionality of ROV 35A or AUV discussed above in relation to FIG. 1. The underwater vehicle 290 can be tethered to a TMS 50A or a marine vessel 5. The underwater vehicle 290 can be controlled remotely or operate autonomously or at least partially autonomously without external control or commands. The underwater vehicle 290 can include an autonomous underwater vehicle that is not tethered to a TMS 50A or marine vessel 5. For example, the underwater vehicle can operate autonomously in a pre-programmed manner without external control or commands. The underwater vehicle 290 can include a seismic data acquisition unit storage compartment 235 that can store one or more seismic data acquisition units 30. The seismic data acquisition units 30 can include seismic data acquisition units 30 shown in FIG. 1. The underwater vehicle 290 can include a base 230 that can support the seismic data acquisition unit storage compartment 235, a propulsion system 270, a robotic arm assembly 205, and a ramp 220. The propulsion system 270 can include one or more propellers, the rotation of which can propel the underwater vehicle 290 in a desired direction at a desired speed. The propulsion system 270 can allow the underwater vehicle 290 to move forward and back in any direction. For example, the propulsion system 270 also can control the orientation of the underwater vehicle 290 by controlling the pitch, roll, and yaw of underwater vehicle 290.

The propulsion system 270 can include a mechanism to generate force, such as a propeller, a thruster, a paddle, an oar, a waterwheel, a screw propeller, a fixed pitch propeller, a variable pitch propeller, a ducted propeller, an azimuth propeller, a water jet, a fan, or a centrifugal pump. The propulsion system 270 can include a fluid propulsion system such as a pump-jet, hydrojet, or water jet that can generate a jet of water for propulsion. The propulsion system 270 can include a mechanical arrangement having a ducted propeller with a nozzle, or a centrifugal pump and nozzle. The propulsion system 270 can have an intake or inlet (e.g., facing a bottom or side of the underwater vehicle 290) that allows water to pass into the propulsion system 270. The water can enter the pump of the propulsion system through the inlet. The water pressure inside the inlet can be increased by the pump and forced backwards through a nozzle. The propulsion system 270 can include a reversing bucket. With the use of a reversing bucket, reverse thrust can be generated. The reverse thrust can facilitate slowing movement of the case underwater vehicle 290, for example responsive to instructions from a control unit 605 (e.g., depicted in FIG. 6) in order to deploy or discharge a seismic data acquisition unit 30.

The system 200 can include one or more propulsion systems 270. The propulsion systems 270 can be integrated with, or mechanically coupled to, a portion of the underwater vehicle 290. The propulsion system 270 can be built into a portion of the underwater vehicle 290. The propulsion system 270 can be attached onto the portion of the underwater vehicle 290 using an attachment or coupling mechanism such as one or more screws, bolts, adhesives, grooves, latches, or pins.

The system 200 can include multiple propulsion systems 270. For example, the system 200 can include one or more propulsions systems 270 on a first portion of the underwater vehicle 290, and one or more propulsion systems 270 on a second side of the underwater vehicle 290. The multiple propulsions systems 270 can be centrally controlled or individually controlled by a control unit 605. The multiple propulsions systems can be independently activated or synchronously activated. For example, by instructing the different propulsion systems to generate different amounts of force, the system 200 can steer or control a direction of movement of the underwater vehicle 290.

The propulsion system 270 can be configured to rotate or change a direction or angle of force being exerted in order to steer the underwater vehicle 290. The system 200, underwater vehicle 290 or propulsion system 270 can include a steering device. The steering device can refer to a steering apparatus that includes multiple components. The steering device can receive instructions from the propulsion system 270 or a control unit 605. The steering device can include, for example, a rudder. In some embodiments, the steering device can include fins. For example, the steering device can include an actuator, spring-mechanism, or hinge that can pivot, rotate or change the orientation of the fin to steer the underwater vehicle 290.

The steering device can use the propulsion system 270, or component thereof, to steer the underwater vehicle 290. For example, the propulsion system 270 can include a nozzle and pump-jets. The nozzle can provide the steering of the pump-jets. Plates or rudders can be attached to the nozzle in order to redirect the water flow from one side to another side (e.g., port and starboard; right and left). The steering device 290 can function similar to air thrust vectoring to provide a pumpjet-powered system 200 with increased agility in the aqueous medium.

The robotic arm assembly 205 can be controlled to pick a seismic data acquisition unit 30 from the seismic data acquisition unit storage compartment and position the seismic data acquisition unit 30 on the ramp 220. The robotic arm assembly 205 may be activated, for example, to place the seismic data acquisition unit 30 on the ramp 220 at a time of a launch event. The ramp 220 can include a first end 210 and a second end 225. The first end 210 is positioned closer to the base 230 than the second end 225 during deployment. The ramp 220 is coupled to the base 230 by way of a hinge 260 that allows the ramp 220 to pivot about the axis of the hinge 260. A ramp cable winch 255 can be used to manipulate a cable 250 (or a wire or a chain) connected between the winch 55 and the second end 225 of the ramp 220. The winch 255 can be controlled to wind or unwind the cable 250 around a drum, thereby causing the second end 225 of the ramp 220 to be pulled towards or away from the base 230. In effect, the winch 225 can be controlled to adjust the desired angle α between the ramp 220 and the base 230.

During operation, the underwater vehicle 290 can be controlled to travel over a seabed 55 near deployment location of the seismic data acquisition unit 30. The robotic arm assembly 205 can be controlled to position the seismic data acquisition unit 30 over the first end of the ramp 220. The winch 255 can be controlled to lower the second end 225 of the ramp 220 to an extent such that the desired angle α between the ramp 220 and the base 230 is achieved. As the second end 225 is below the first end 210 of the ramp, the seismic data acquisition unit 30 can slide down a sliding surface 265 of the ramp 220 from the first end 210 towards the second end 225 of the ramp 220. When the seismic data acquisition unit 30 reaches the second end 225 of the ramp, the seismic data acquisition unit 30 can roll off of the ramp 220 and be deposited on the seabed 55. In some examples, the angle α can represent an angle between the ramp 220 and a horizontal plane.

To improve the precision with which the seismic data acquisition units 30 are deployed at their respective target locations on the seabed 55, the seismic data acquisition unit 30 is deployed form the second end 225 of the ramp 220 when the second end 225 is directly over the target location of the seismic data acquisition unit 30. In addition, the horizontal component of the velocity with which the seismic data acquisition unit 30 is deployed from the second end 225 of the ramp 220 is equal to zero, where the horizontal component of the velocity of the seismic data acquisition unit 30 is measured in a frame of reference that includes the seabed 55. Thus, as the horizontal component of velocity of the seismic data acquisition unit 30 is equal to zero when it rolls off of the second end 225 of the ramp 220, the seismic data acquisition unit 30 falls directly downwards onto the seabed 55 and over the target location.

Figure 3:
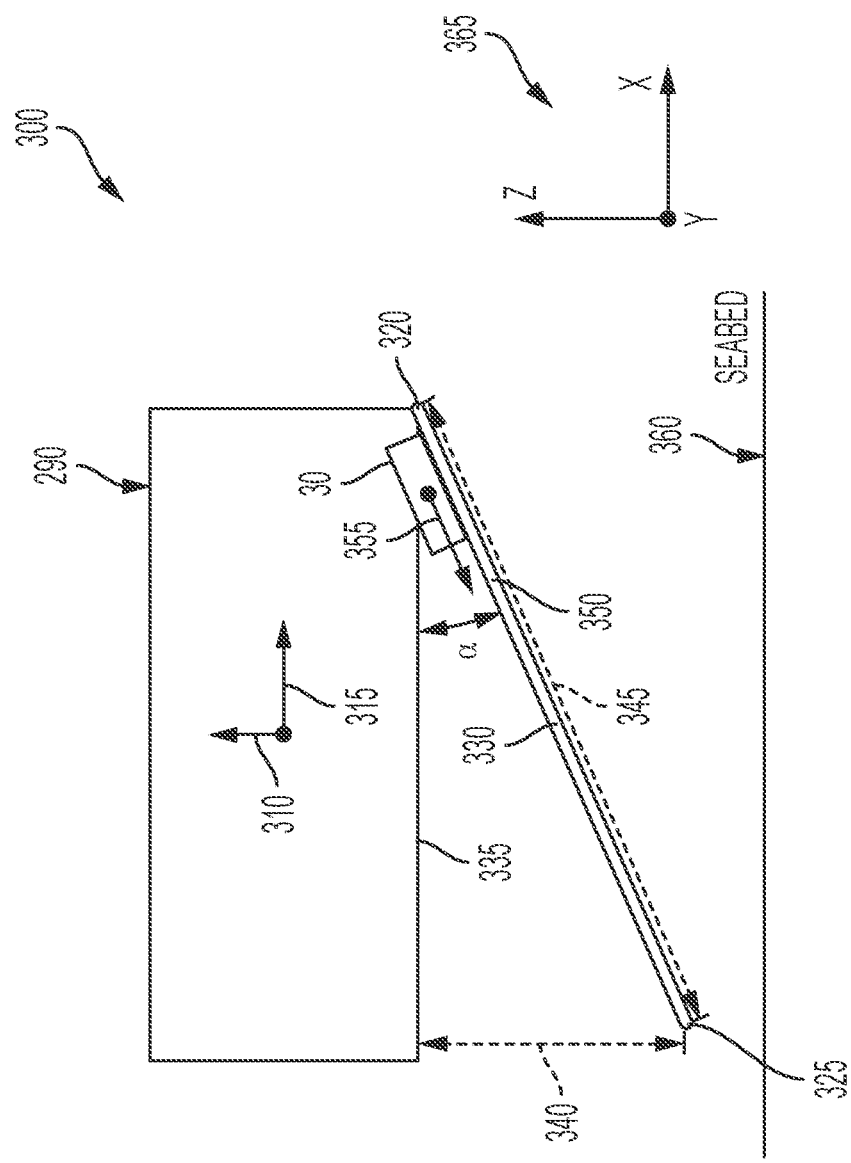
FIG. 3 illustrates an underwater vehicle and a ramp for deploying seismic data acquisition units in accordance with an embodiment.

FIG. 3 shows a schematic 300 of a ROV and a ramp for deploying seismic data acquisition units. The schematic 300 depicts an underwater vehicle 290 having an adjustable ramp 350. The underwater vehicle 290 can represent, or include one or more component or functionality of the underwater vehicle 290 shown in FIG. 2. The underwater vehicle 290 can be positioned over the seabed 55 and traveling with a velocity VR, having a horizontal component 315 with a first magnitude and a first direction (e.g., positive x-direction), and having a vertical component 310 with a second magnitude and a positive y-direction. The direction of the velocity VR of the underwater vehicle 290 can be represented in a frame of reference 365 that includes the seabed 55. The ramp 350 is positioned at an angle α with respect to a base 335 of the underwater vehicle 290. The ramp 350 can have a length 345, measured between a first end 320 and a second end 325 of the ramp 350, and a distance 340 measured between the base 335 and the second end 325 of the ramp 350.

The ramp 350 is inclined such that when a seismic data acquisition unit 30 is positioned on or near the first end 320 of the ramp 350, the seismic data acquisition unit 30 can slide down the first surface 330 of the ramp 350 towards the second end 325 of the ramp 350, and eventually drop off the second end 325 of the ramp 350 and onto the seabed 55. When the seismic data acquisition unit 30 is positioned on or near the first end 320 of the ramp 350, the seismic data acquisition unit 30 accelerates down the first surface 330 of the ramp with a velocity VN 355 relative to the ramp 350. The acceleration of the seismic data acquisition unit 30 can be based on several factors, such as, for example, the angle α the ramp 350 makes with the base 335 (or with the horizontal plane X-Y of the plane or reference 365), the frictional force between the seismic data acquisition unit 30 and the first surface 330, the velocity VR of the underwater vehicle 290, speed and direction of the ocean currents, bathymetry of the seabed 55, etc. Due to the acceleration of the seismic data acquisition unit 30 down the first surface 330 of the ramp 350, the velocity VN 355 of the seismic data acquisition unit 30 relative to the ramp 350 will increase. The seismic data acquisition unit 30 can continue to accelerate down the ramp 30 until it reaches the second end 325 of the ramp 350, from where it is launched towards the seabed 55.

Figure 4:
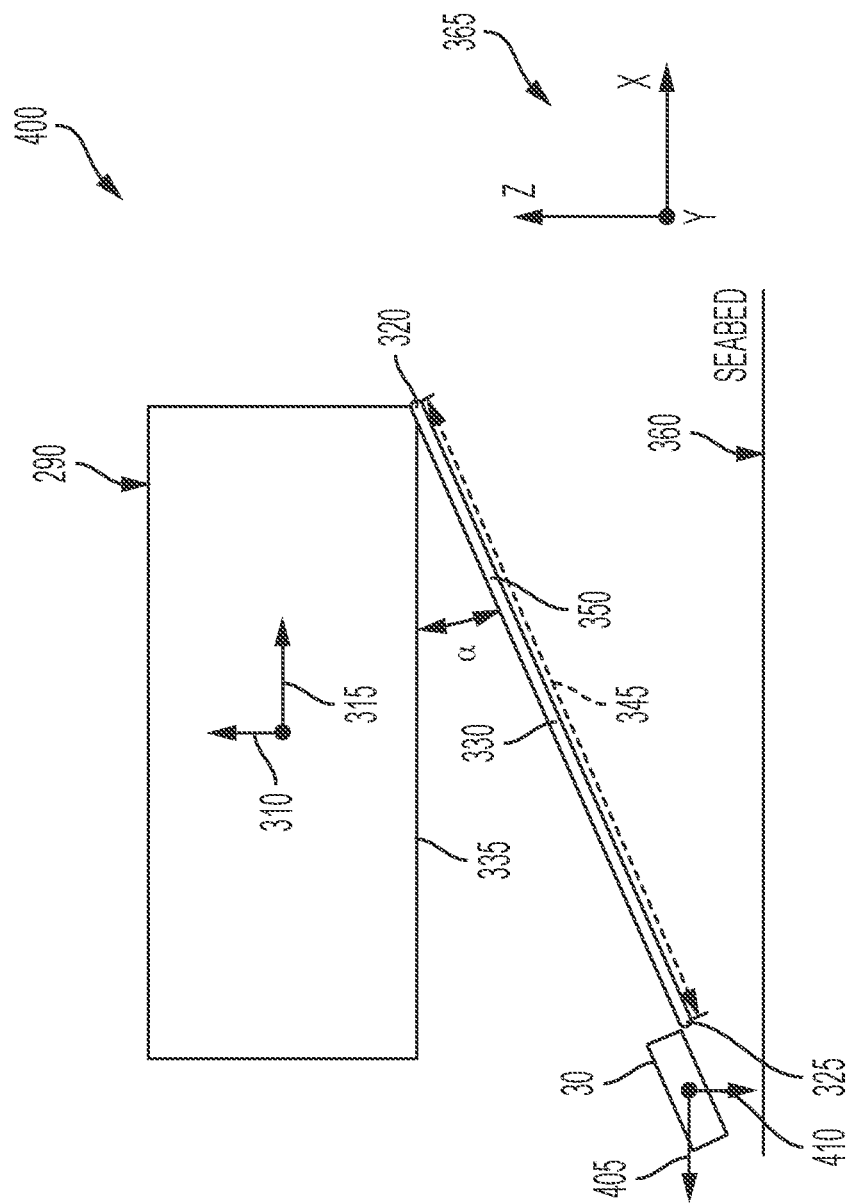
FIG. 4 illustrates an underwater vehicle and a ramp for deploying seismic data acquisition units in accordance with an embodiment.

FIG. 4 shows another schematic 400 of an underwater vehicle and a ramp for deploying seismic data acquisition units. The schematic 400 in FIG. 4 depicts the seismic data acquisition unit 30 when it is launched from the second end 325 of the ramp 350. The seismic data acquisition unit 30 can be launched from the second end 325 with a launch velocity VL having a horizontal component 405 and a vertical component 410. The seismic data acquisition unit 30 can be lunched from the second end 325 of the ramp 350 such that a magnitude of the horizontal component 405 of the launch velocity VL is equal to zero. In one example, the seismic data acquisition unit 30 can be launched from the second end 325 of the ramp 350 such that the magnitude of the horizontal component 405 of the launch velocity VL is no more than $\frac{1}{10}^{th}$ knot or 0.05 meters per second. In addition, the horizontal component 405 of the launch velocity VL can have a second direction that is opposite to the first direction of the horizontal component 315 of the velocity VR of the underwater vehicle 290. The horizontal component 315 of the velocity VR of the underwater vehicle 290 can be in the positive-x direction in the frame of reference 365. On the other hand, the horizontal component 405 of the velocity VN of the seismic data acquisition unit 30 when it is launched from the second end 325 of the ramp 350 is in the opposite negative-x direction in the frame of reference 365, and has a zero magnitude. The zero magnitude of the horizontal component 405 ensures that when the seismic data acquisition unit 30 is launched from the second end 325 of the ramp 350, the seismic data acquisition unit 30 drops down in the negative-z direction, or the direction of the vertical component 410, of the velocity VN of the seismic data acquisition unit 30, without any displacement in the horizontal direction.

The zero magnitude of the horizontal component 405 at launch ensures that when the second end 325 of the ramp 350 is positioned over a target location, the seismic data acquisition unit 30 would drop straight down to the target location without any horizontal displacement. The velocity VR of the underwater vehicle 290 can be controlled to move towards the target location with a horizontal component 315 of the velocity VR having a first magnitude and a first direction. When the underwater vehicle 290 is at a predetermined distance or time from the target location, the underwater vehicle 290 can be controlled to deploy the seismic data acquisition unit 30 at the first end 320 of the ramp 350. As an example, the robotic arm assembly (205, FIG. 2), of the underwater vehicle 290 can be controlled to deliver the seismic data acquisition unit 30 from the seismic data acquisition unit storage compartment (235, FIG. 1) to the first end 320 of the ramp 350.

An instant when the seismic data acquisition unit 30 is deployed at the first end 320 of the ramp 350 can be referred to as a seismic data acquisition unit deploy event. The seismic data acquisition unit deploy event can be timed based on the time $T_{d-1}$ that the seismic data acquisition unit 30 takes to slide down the first surface 330 of the ramp 350 from the first end 320 to the second end 325 of the ramp 350. The time $T_{d-1}$, in turn, can be based, in part, on the angle α of the ramp, which in turn can be based on the desired magnitude of the horizontal component 405 of the seismic data acquisition unit 30. Thus, the seismic data acquisition unit deploy event can occur $T_{d-1}$ seconds before the second end 325 of the underwater vehicle 290 is expected to arrive directly over the target location for the seismic data acquisition unit 30. In some examples, the seismic data acquisition unit deploy event can be based on a distance from the target location. For example, a seismic data acquisition unit deploy distance from the target location can be determined based on the magnitude of the horizontal component 315 of the velocity VR of the seismic data acquisition unit 30 and the time $T_{d-1}$ that the seismic data acquisition unit 30 takes to launch after the seismic data acquisition unit 30 has been deployed at the first end 320. The seismic data acquisition unit deploy event can be initiated when the underwater vehicle 290, which is moving directly towards the target location reaches a position such that the second end 325 of the ramp 350 is at the seismic data acquisition unit deploy distance from the target location.

An instant when the seismic data acquisition unit 30 is launched from the second end 325 of the ramp 350 can be referred to as a seismic data acquisition unit launch event. The seismic data acquisition unit launch event can be ensured to occur when the second end 325 of the ramp 350 is directly over the target location of the seismic data acquisition unit 30. The timing of the seismic data acquisition unit launch event can be determined based on several factors, such as, for example, the velocity VR of the underwater vehicle 290 and the instantaneous distance of the target location from the second end 325 of the ramp 350.

In one example, based on the speed of the underwater vehicle 290 and the instantaneous distance between the underwater vehicle 290 and the target location, the underwater vehicle 290 can, in real-time, determine the amount of time $T_{to\text{-}target}$ that the second end 325 of the ramp 350 of the underwater vehicle 290 will take to reach the target location. The data acquisition unit deploy event can occur when that amount of time, $T_{to\text{-}target}$, is equal to the time $T_{d-1}$. At that instant, the seismic data acquisition unit 30 can be deployed at the first end 320. By the time the underwater vehicle 290 reaches the target location, the seismic data acquisition unit 30 would be launched from the second end 325 of the ramp 350. As the angle α of the ramp 350 has been adjusted to ensure a zero velocity horizontal component for the seismic data acquisition unit 30, the seismic data acquisition unit 30 would be launched from the second end 325 when the second end is over the target location and drop directly down over the target location.

In one example, the underwater vehicle 290 can determine an accuracy and precision of the deployment of the seismic data acquisition unit 30 on the target location. The underwater vehicle 290 can communicate with the seismic data acquisition unit 30 to receive its location determined by a GPS system included in the seismic data acquisition unit 30. The underwater vehicle 290 can compare the location received from the seismic data acquisition unit 30 with the target location stored in the memory of the underwater unit 290. Upon detecting a difference over a predetermined threshold (such as, for example, one feet), the underwater vehicle 290 can adjust the timing of the deploy event to adjust for the inaccuracy in deployment.

In some examples, the ramp 350 can have a non-linear slope. The ramp 350 can include a lip portion near the second end 325 of the ramp 350. The lip portion can have a slope that is different from the slope of the first surface 330 of the ramp 350. The ramp 350 can include an intermediate end on the ramp 350 located between the first end 320 and the second end 325. The portion of the ramp 350 extending between the first portion 320 and the intermediate end can be at an angle with the lip portion of the ramp 350 that extends between the intermediate end and the second end 325. As the seismic data acquisition unit 30 travels down the ramp 350, the seismic data acquisition unit 30 can pass over the lip portion before being launched over the second end 320 of the ramp 350. The angle between the lip portion and the remainder of the ramp 350 can be selected to increase or decrease the acceleration of the seismic data acquisition unit 30 before it is launched over the second end 325.

In some examples, the ramp 220 (FIG. 2), can be modified such that friction between the seismic data acquisition unit 30 and the first surface 265 can be reduced. Reducing the friction between the seismic data acquisition unit 30 and the first surface 265 may be needed when the length of the ramp 220 is not sufficient to impart the desired velocity to the seismic data acquisition unit 30. In some such examples, the ramp 220 can include rollers over which the seismic data acquisition unit 30 can roll towards the second end 225 of the ramp.

Figure 5:
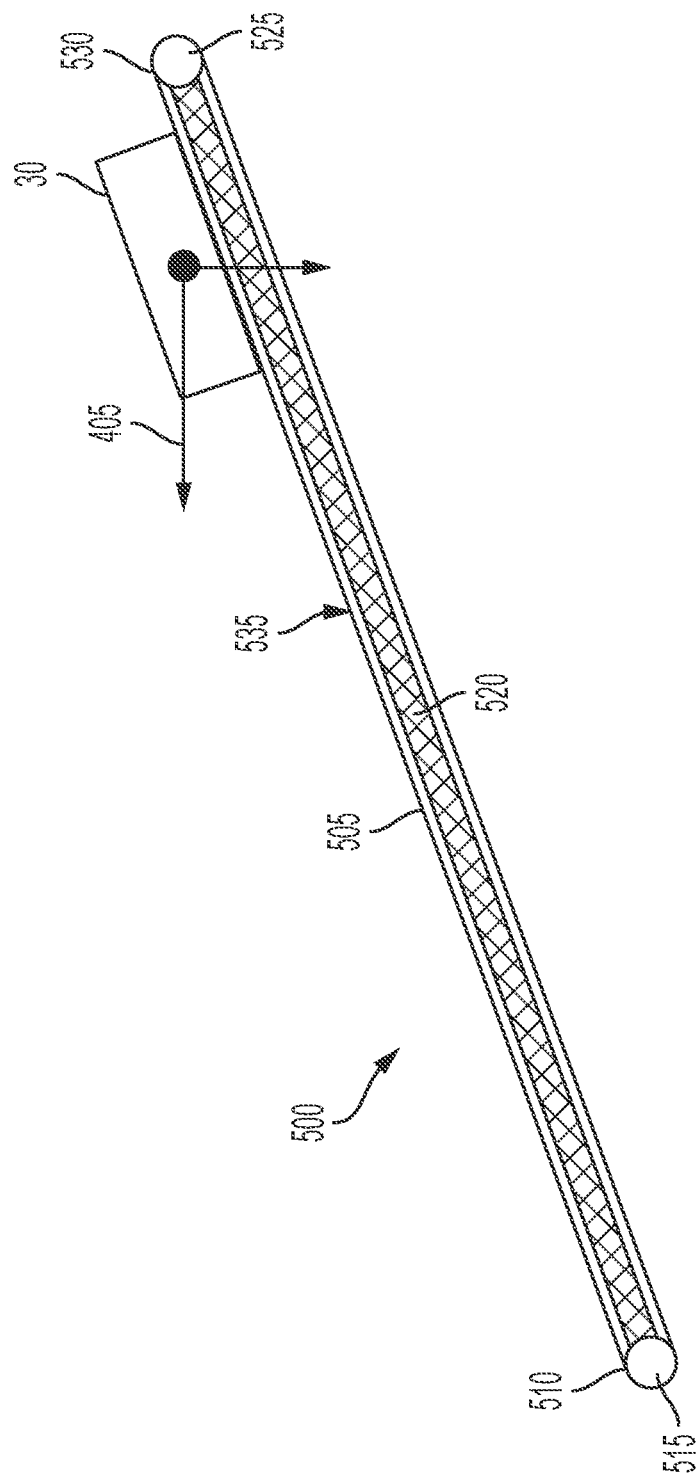
FIG. 5 depicts an example ramp in accordance with an embodiment.

FIG. 5 depicts an example conveyer ramp 500. The conveyer ramp 500, for example, can be used in place of the ramp 220 shown in FIG. 2. The conveyer ramp 500 can be a powered ramp that includes a first moveable surface 505, the speed of which can be controlled by the underwater vehicle 290. The first moveable surface 505 can be an outer surface of an endless belt 535 that is wrapped around a support structure 520, a first pulley 525, and a second pulley 515. The first pulley 525 can be positioned at a first end 530 of the conveyer ramp 500, while the second pulley 515 can positioned at a second end 510 of the conveyer ramp 500. The underwater vehicle 290 can rotate the first pulley 525 and the second pulley 515 in concert to cause the belt 535 to rotate from the first end 530 to the second end 510 of the conveyer ramp 500. The underwater vehicle 290 can deploy the seismic data acquisition unit 30 on the first moveable surface 505 at the first end 530 of the conveyer ramp 500 while rotating the conveyer belt 535. The rotation of the conveyer belt 535 can cause the seismic data acquisition unit 30 to move from the first end 530 towards the second end 510, and be launched to the seabed. The underwater vehicle 290 can control the speed of rotation of the conveyer belt 535 such that a horizontal component 405 of the seismic data acquisition unit 30 when launched from the second end 510 of the conveyer ramp 500 has zero magnitude. In one example, the speed of the conveyer belt 535 can be set to be equal to cosine(α) times the horizontal component of the velocity VR of the underwater vehicle 290, where a is the angle the conveyer ramp 500 makes with a base of the underwater vehicle (or with the horizontal plane). In some examples, the conveyer ramp 500 can be positioned at a zero degree angle with the base 230 (FIGS. 3 and 4) of the underwater vehicle 290.

Figure 6:
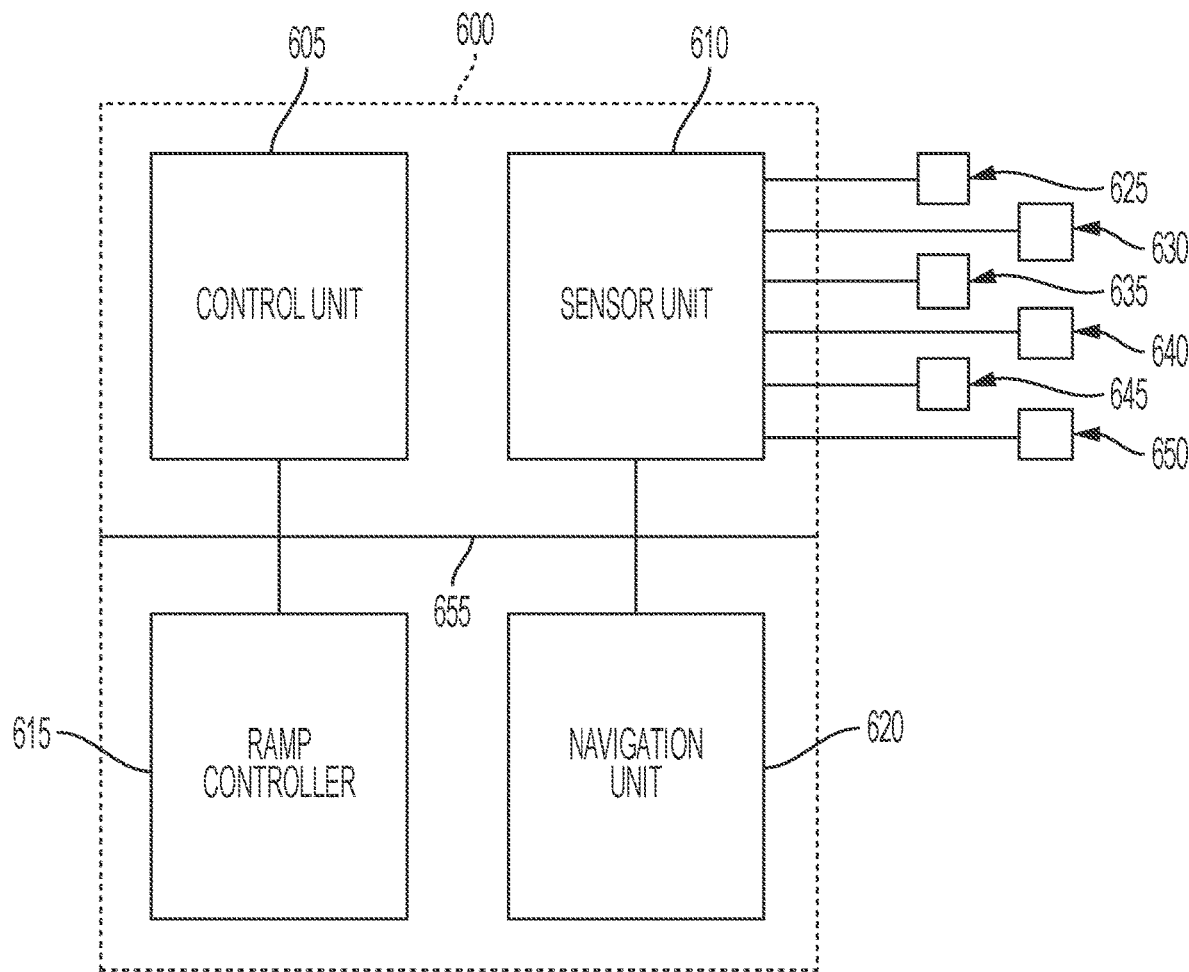
FIG. 6 depicts a block diagram of a control circuitry to deploy seismic data acquisition units in accordance with an embodiment.

FIG. 6 shows a block diagram of a control circuitry 600 of an underwater vehicle. For example, the control circuitry 600 can be utilized to implement the control circuitry of the underwater vehicle 290 shown in FIG. 2. The control circuitry 600 includes a control unit 605, a sensor unit 610, a ramp controller unit 615, and a navigation unit 620. The control unit 605 can refer to or include a deployment control unit. The sensor unit 610 can be communicably connected to one or more sensors, such as, for example, a visual or image sensor 625, an audio sensor 630, an accelerometer 635, sonar 640, radar 645, and a LIDAR 650. The sensor unit 610 can be communicably coupled to additional sensor such as a temperature sensor, a pressure sensor, a light meter, a photodiode, a pH sensor, etc. The control unit 605, the sensor unit 610, the ramp controller unit 615, and the navigation unit 620 can communicate over a communication bus 655 (e.g., bus 1505 depicted in FIG. 15). The control unit 605 can control the various operations of the underwater vehicle 290 and can include programmable processors and memory, which can store data and programs that can be executed for the operation of the underwater vehicle 290.

The sensor unit 610 can provide an interface for communicating with and receiving data from the sensors. In some examples, the control unit 605 can request the sensor unit 610 to provide a sensor reading from the various sensors coupled to the sensor unit 610, in response to which the sensor unit 610 can obtain the desired data from the appropriate sensor and provide the data to the control unit 605. The navigation unit 620 can control the navigation of the underwater vehicle 290. In some examples, the control unit 605 can provide GPS coordinates of a target location to the navigation unit 620, which can control the propulsion system of the underwater vehicle 290 such that the underwater vehicle 290 can be navigated to the desired target location at a desired speed or within a desired time. The navigation unit 620 also can provide the control unit 605 with the current location or coordinates of the underwater vehicle 290. The ramp controller 615 can control the operation of the ramp (220, FIG. 2) of the underwater vehicle 290. For example, the control unit 605 can provide a value for the angle α to the ramp controller 615, which, in response, can control the winch 255 (FIG. 2) of the underwater vehicle 290 such that the ramp 220 is positioned at the desired angle α. In instances where the ramp is a conveyer ramp (500, FIG. 5), the ramp controller 615, responsive to a speed value received from the controller 605, may also control the speed of the conveyor belt. It is understood that functionality of the ramp controller 615 can be carried out by another unit within the control circuitry 600.

Figure 7:
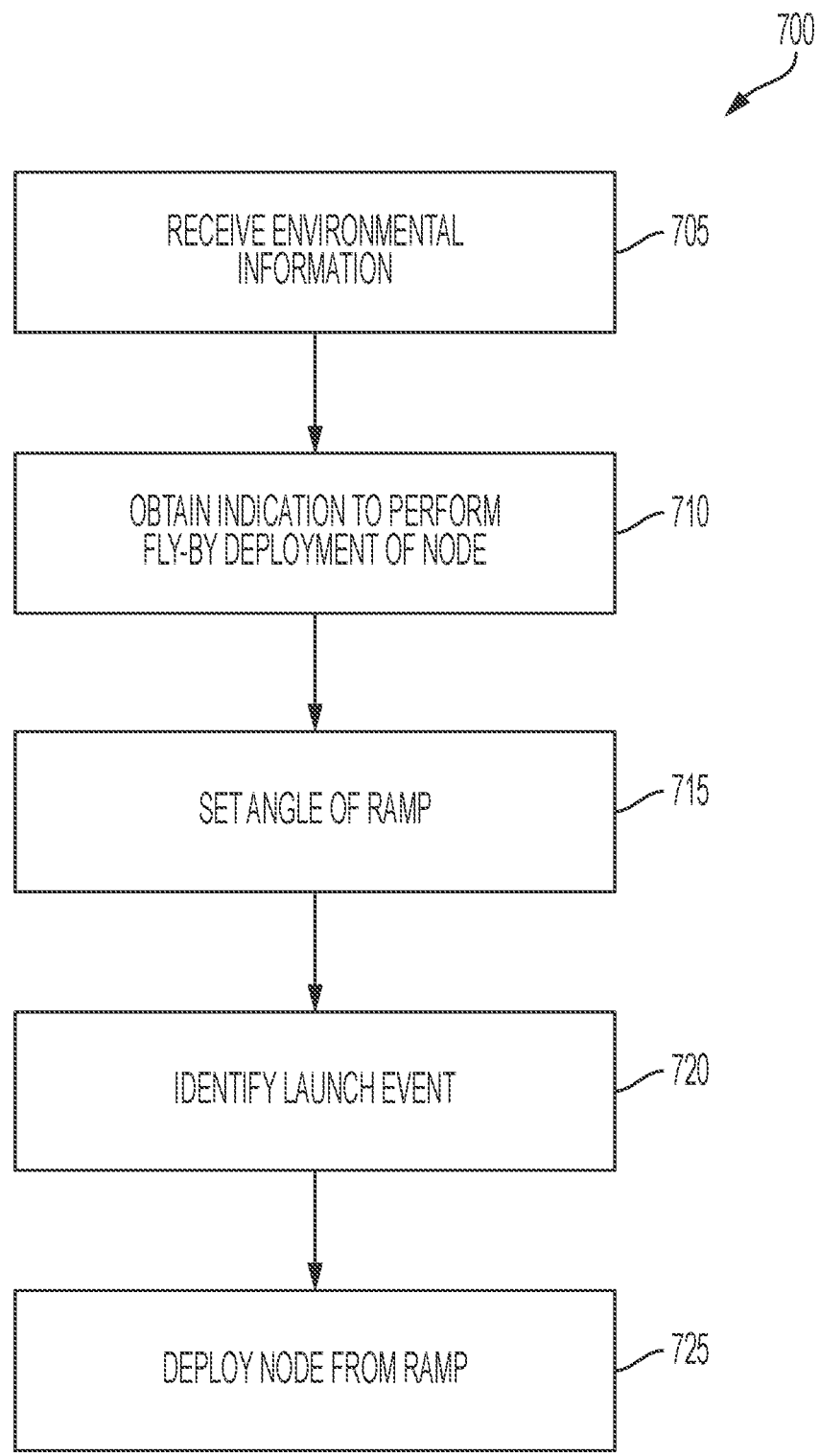
FIG. 7 depicts a flow diagram of a method for delivering seismic data acquisition units to an ocean bottom in accordance with an embodiment.

FIG. 7 depicts a flow diagram of a method 700 for delivering seismic data acquisition units to an ocean bottom. In some examples, the method 700 can be executed by the control circuitry 600, shown in FIG. 6. The method 700 includes receiving environmental information (ACT 705). In some examples, the control circuitry 600 can receive environmental information while the underwater vehicle 290 is underwater. In some examples, the environmental information can include values of environmental variables such as, for example, a velocity of the underwater vehicle 290, an elevation of the underwater vehicle 290 above the seabed, a turbidity of the aqueous medium in which the underwater vehicle 290 is travelling, a temperature of the aqueous medium, a topology of the ocean bottom, a composition of the ocean bottom, and a presence of marine life or growths.

At least a portion of the environmental information can be determined by the control circuitry 600. For example, as shown in FIG. 6, the control circuitry 600 is communicably coupled to sensors such as a visual or image sensor 625, an audio sensor 630, an accelerometer 635, sonar 640, radar 645, and a LIDAR 650, and additional sensors such as a temperature sensor, pressure sensor, light meter, a photodiode, pH sensor, etc. The control circuitry 600 can use the data received from one or more of these sensors to determine the values of at least some of the environmental variables.

In some examples, at least a portion of the environmental information can be received by the control circuitry 600 from a surface vessel. In instances where the underwater vehicle 290 is not capable of measuring, or not in a position to measure, a value of a desired environmental variable, the value of the desired environmental variable can be received form a surface vessel, such as the surface vessel 20 shown in FIG. 1. In one example, the desired environmental variables can include speed and direction of the ocean currents, bathymetry of the seabed 55, etc. The surface vessel can utilize one or more sensors communicably coupled to the surface vessel to measure the values of the desired environmental variables, and communicate the values to the underwater vehicle 290 via a tether and/or cable, such as the umbilical cable 44A and the tether 46A.

The method 700 further includes obtaining, based on the environmental information and policy, an indication to perform fly-by deployment (ACT 710). A fly-by deployment can include launching seismic data acquisition units while the underwater vehicle 290 is in motion. For example, referring to FIG. 2, during a fly-by deployment, the underwater vehicle 290 can launch seismic data acquisition units 30 from the ramp 220 while the underwater vehicle 290 is moving from one target location to another at a non-zero travel velocity VR. The control circuitry 600 can determine whether to perform fly-by deployment based, in part, on the environmental information received by the control circuitry 600. For example, the control circuitry 600 can use values of environmental variables such as velocity of the underwater vehicle 290 and the location of the underwater vehicle 290 to determine whether to perform fly-by deployment. The policy can specify one or more threshold values for the environmental variables. The control circuitry 600 can compare the received values of the environmental variables with the threshold values specified by the policy to determine whether to perform fly-by deployment. For example, the policy may specify that a fly-by deployment may not be performed if the travel velocity of the underwater vehicle 290 is greater than 5 meters per second. The control circuitry 600 can compare the current travel velocity with the threshold value of 5 meters per second, and if the current travel velocity is less than 5 meters per second, the control circuitry 600 can determine that fly-by deployment of seismic data acquisition units 30 can be performed.

In some examples, the control circuitry 600 can determine to perform the fly-by deployment based on detecting an absence of marine life at the ocean bottom. The control circuitry 600 can utilize sensors such as, for example, image sensors and radar to determine whether any marine life is present in the vicinity of the underwater vehicle 290 or in the vicinity of the target locations. Presence of marine life in the vicinity of the underwater vehicle 290 or in the vicinity of the target locations can increase the risk of damage to both the marine life and the underwater vehicle 290. In such instances, the control circuitry 600 may determine to abort fly-by deployment of seismic data acquisition units. The control circuitry 600, upon detecting the absence of marine life at the ocean bottom, can determine that the fly-by deployment of seismic data acquisition units can be performed.

In some examples, the control circuitry 600 can block fly-by deployment upon detection of an obstruction. An obstruction can include marine life, or other objects positioned on or over the sea bed. In some instances, the control circuitry 600 may block fly-by deployment only when the obstruction is detected along the path to the target location of seismic data acquisition unit deployment. In some examples, the control circuity 600 can perform an emergency stopping method to stop the underwater vehicle 290. For example, the control unit 30 can instruct the navigation unit 620 to activate one or more reverse facing thrusters to decelerate and eventually stop the underwater vehicle 290.

In some examples, the control circuity 600 can determine performing fly-by deployment based on a current of the aqueous medium. The ocean current can be a continuous, directed movement of ocean water. High magnitude ocean currents may affect the ability to control the operation of the underwater vehicle 290. Under such circumstances, deployment of seismic data acquisition units may not be feasible or may accompany a high risk of inaccurate deployment. The control circuitry 600 can receive the value of the ocean current in the vicinity of the underwater vehicle 290 or in the vicinity of one or more target locations, and if the value of the ocean current is below the threshold value, the control circuitry 600 can determine to perform fly-by deployment of the seismic data acquisition unit.

In some examples, the control circuitry 600 can block a fly-by deployment of a second seismic data acquisition unit responsive to detecting that a level of visibility is below a visibility threshold. In some instances, the control circuitry 600 can cause the underwater vehicle 290 to abort fly-by deployment and land on the ocean bottom, if the level of visibility is below the visibility threshold.

In some examples, the control circuitry 600 can receive instructions to perform fly-by deployment. For example, a device outside of the underwater vehicle 290, such as, the surface vehicle 20 can determine whether to perform fly-by deployment, and communicate the determination to the control circuitry 600 via the communication cable 44A and tether 46A.

At ACT 715, the method 700 can further include setting, responsive to the determination to perform fly-by deployment and based on environmental information, an angle of a ramp with respect to a base of the ROV. The control unit 605 of the control circuitry 600 shown in FIG. 6 can determine an angle α of the ramp 220 to cause the seismic data acquisition unit (e.g., 30, FIG. 4) to have a zero magnitude horizontal component (405, FIG. 4) with respect to the seabed when the seismic data acquisition unit is launched from the ramp 220. The control unit 605 can determine the angle α based on one or more environmental variables, such as, for example, a horizontal component (315, FIG. 4) of the travel velocity VR or the underwater vehicle 290, frictional forces between the seismic data acquisition unit and the ramp (e.g., the frictional coefficient of the ramp), buoyancy of the seismic data acquisition unit, a current of the aqueous medium, etc.

The method 700 further includes identifying a launch event for a seismic data acquisition unit (ACT 720). A launch event can denote an instant in time when the seismic data acquisition unit is launched form the underwater vehicle 290. For example, referring to FIG. 4, a launch event can denote the instant in time when the seismic data acquisition unit 30 is launched from the second end 325 of the ramp 350. The control circuitry 600 can determine the launch event based on one or more factor, such as, for example, velocity VR of the underwater vehicle 290 and the instantaneous distance of the target location from the second end 325 of the ramp 350. In some examples, the ROV 309 can determine the timing of the seismic data acquisition unit launch event by determining a time to the target location ($T_{to\text{-}target}$). In one example, the underwater vehicle 290 can determine the seismic data acquisition unit deploy event based on the determination of the seismic data acquisition unit launch event, where the seismic data acquisition unit launch event can denote the instant in time when the seismic data acquisition unit is placed on the first end 320 of the ramp 350. The control circuitry 600 may also determine the launch event based on a location or a timing function, where the location corresponds to a target location for the seismic data acquisition unit or a location of the underwater vehicle 290 when the seismic data acquisition unit is deployed.

The method 700 further includes deploying the seismic data acquisition unit from the second end of the ramp towards the ocean bottom based on the identification of the launch event and the environmental information (ACT 725). The control circuitry 600 can determine the launch event such that when the seismic data acquisition unit is launched from the second end of the ramp, the seismic data acquisition unit is directed straight down towards the target location on the seabed without any horizontal displacement. The control circuitry 600 can time the deployment of the seismic data acquisition unit at the first end of the ramp such that by the time the seismic data acquisition unit is launched from the second end, the seismic data acquisition unit is positioned over the target location and the magnitude of the horizontal component of the velocity of the seismic data acquisition unit, with respect to the seabed, is zero.

Systems, methods, and apparatus of the present technical solution generally also relate to retrieving seismic data acquisition units from deployment locations on the seabed. Where multiple seismic data acquisition units are to be retrieved from multiple deployment locations, an underwater vehicle may have to halt at each deployment location to retrieve a seismic data acquisition unit. With a large number of deployment locations, halting the underwater vehicle at each deployment location can considerable increase the total seismic data acquisition unit retrieval time.

The moving underwater vehicle can retrieve seismic data acquisition units from the seabed without having to halt. The underwater vehicle can include an underwater vehicle interlocking mechanism that can be activated when the underwater vehicle is in proximity to the deployed seismic data acquisition unit that needs to be retrieved. The interlocking mechanism can engage with a complimentary interlocking mechanism on the seismic data acquisition unit to retrieve the seismic data acquisition unit. By retrieving the seismic data acquisition unit while in motion, the underwater vehicle can reduce the time needed to retrieve multiple seismic data acquisition units from the seabed.

Referring to FIG. 1, the ROV 35A can be used to retrieve seismic data acquisition units such as sensor devices 30 deployed on the seabed 55. The ROV 35A can be towed by the first vessel 5 various deployment locations. Once at a deployment location, the ROV 35A can retrieve the sensor devices 30 from the seabed and store the sensor devices 30 in a storage compartment 40 of the ROV 35A. The vessel 5 can continue to move during the retrieval operation, and need not stop when the ROV 35A is near a deployment location. For example, a retrieval operation can include the vessel 5 traversing a route that travels over the first row R1 and then travels over the second row R2. The ROV 35A can be towed over the sensor devices 30 deployed on the seabed 55 along the first row R1 and the second row R2. While traversing the route over the row R1 of sensor devices 30, the vessel 5 can continue to move in the +X direction without stopping, as the ROV 35A need not halt to retrieve the sensor device 30 from the seabed 55. Once the vessel 5 reaches the end of the row R1, the vessel can take a 180 degree turn and travel in the −X direction along the second row R2. Again, the vessel 5 need not stop along the route, as the ROV 35A can retrieve the sensor devices 30 form the seabed 55 without having to halt. As the vessel 5 does not have to halt at each location of the sensor devices 30, the amount of time needed to complete the retrieval operation can be reduced.

Figure 8:
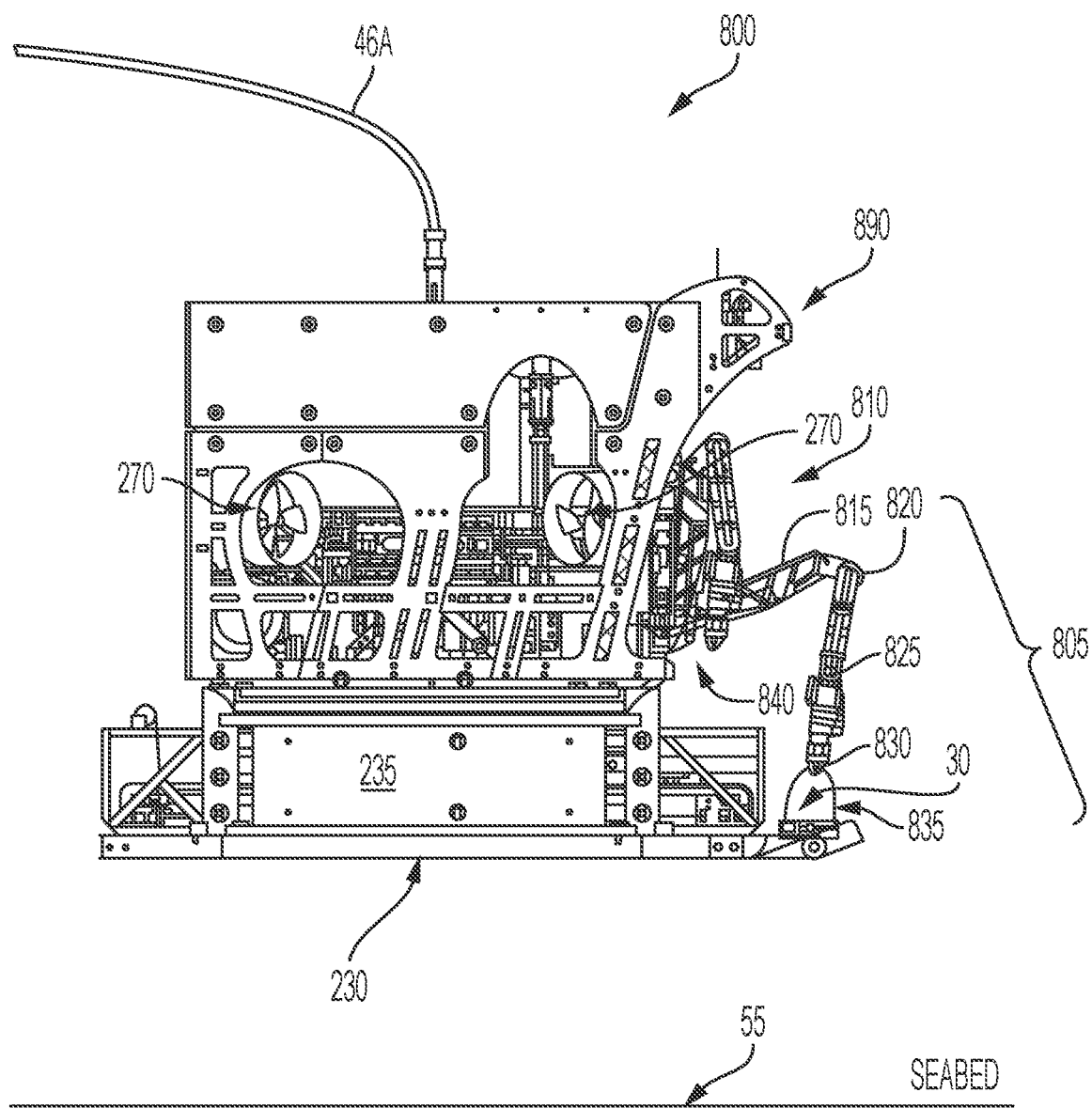
FIG. 8 illustrates a system for acquiring seismic data in accordance with an embodiment.

FIG. 8 illustrates a system for acquiring seismic data in accordance with an embodiment. The system 800 can include an underwater vehicle 890. The underwater vehicle 890 can include one or more system, component or functionality of ROV 35A or AUV discussed above in relation to FIG. 1. The underwater vehicle 890 can include one or more system, component or functionality of the underwater vehicle 290 depicted in FIG. 2. For example, the underwater vehicle 890 shown in FIG. 8 may not include a ramp, such as the ramp 220 in the underwater vehicle 290 shown in FIG. 2. In another example, the underwater vehicle 890 can be similar to the underwater vehicle 290 shown in FIG. 2 and include a ramp such as the ramp 220. The ramp 220 can be deactivated or pulled up during the retrieval operation.

The underwater vehicle 890 can include one or more underwater vehicle interlocking mechanisms including, for example, a first robotic arm 805 and a second robotic arm 810. The interlocking mechanism can also include, for example, a capture device such as, for example, a clamp, a hook, a clasp, a claw, a suction device, a suction cup, a magnet, or an electromagnet. The second robotic arm 810 is shown in a folded configuration, while the first robotic arm 805 is shown engaged with a seismic data acquisition unit 30 that is positioned on a portion of or extending from the base 230. The first robotic arm 805 or the second robotic arm 810 can be used for deployment or retrieval operations. The first robotic arm 805 can be used for both deployment and retrieval operations. The second robotic arm 810 can be used for both deployment and retrieval operations. The underwater vehicle 890 can include only one of the first robotic arm 805 or the second robotic arm 810, or both. In some instances, one of the first robotic arm 805 and the second robotic arm 810 can be used exclusively for seismic data acquisition unit 30 deployment, while the other of the first robotic arm 805 and the second robotic arm 810 can be used exclusively for retrieval of the seismic data acquisition units 30 from the seabed 55.

The underwater vehicle 890 can include a joint motor 840 designed, constructed and operational to move the first robotic arm 805 or the second robotic arm 810. The joint motor 840 can receive instructions from a control circuitry, such as control circuitry 900. The joint motor 840 can provide or exert lateral or rotational forces in one or more degrees of freedom. The joint motor 840 can include an actuator, a linear actuator, rotational actuator, servo motor, geared motor, stepper motor, solenoid, or pneumatic or hydraulic motors.

The first robotic arm 805 (or underwater vehicle interlocking mechanism) can include an upper arm portion 815, an elbow portion 820, a forearm portion 825 and a gripper portion 830. One end of the upper arm portion 815 can be coupled to the base 230, while a second end of the upper arm portion 815 can be coupled to the elbow portion 820. The forearm portion 825 extends between the elbow portion 820 and the gripper portion 830. The elbow portion 820 can include a pivoting mechanism that can allow the forearm portion 825 with respect to the upper arm portion 815. The gripper portion 830 can include, for example, a clamp, a hook, a clasp, a claw, a suction device, a suction cup, a magnet, or an electromagnet that can allow the gripper portion 830 to engage (or mechanically engage or hold) with the sensor device 30. The gripper portion 830 can be capable of retrieving or grabbing the sensor device 30 from the seabed 55 and positioning the sensor device 30 for storage, such as in the storage compartment 235 or another storage container external or different from the underwater vehicle 890. The first robotic arm 805 can include additional joints and rotating portions that can add additional degrees of freedom. The second robotic arm 810 can include one or more component or functionality of the first robotic arm 805, such as, for example, include an upper arm portion, an elbow portion, a forearm portion and a gripper portion.

The first robotic arm 805 depicted in FIG. 8 can illustrate the underwater vehicle interlocking mechanism picking up the seismic data acquisition unit 30 and placing the seismic data acquisition unit on a portion of the base 230 to facilitate storage or retrieval of the seismic data acquisition unit 30. The seismic data acquisition unit 30 can include a seismic data acquisition unit interlocking mechanism 835, such as a loop or telltale, that can facilitate the gripper 830 grabbing, engaging, or coupling with the seismic data acquisition unit 30. The seismic data acquisition unit interlocking mechanism 835 can be connected to the seismic data acquisition at one or more positions on the seismic data acquisition units.

Figure 9:
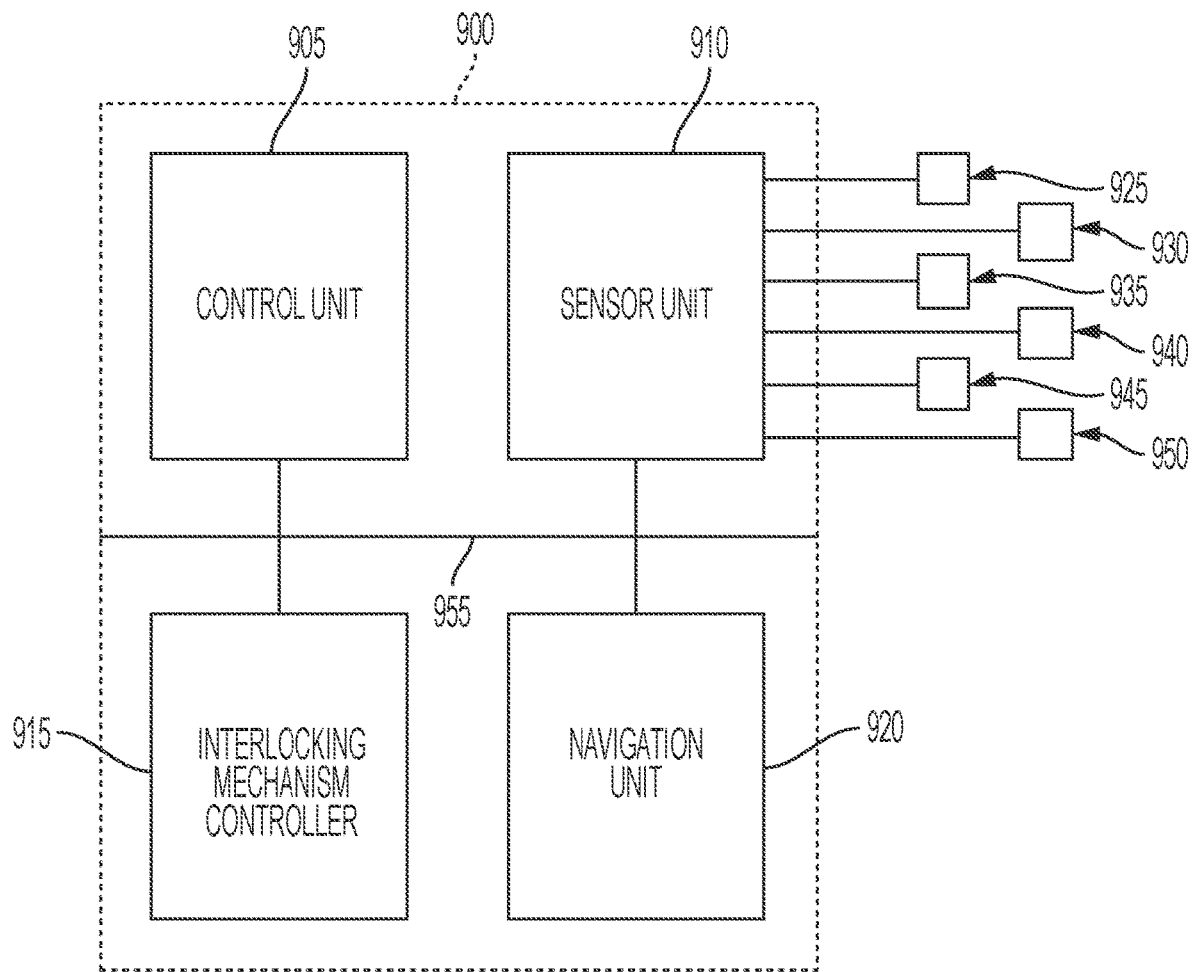
FIG. 9 is a block diagram of a control circuitry of an underwater vehicle in accordance with an embodiment.

FIG. 9 shows a block diagram of a retrieval control circuitry 900 of an underwater vehicle. For example, the retrieval control circuitry 900 can be utilized to implement the control circuitry of the underwater vehicle 890 shown in FIG. 8. The retrieval control circuitry 900 can include a control unit 905 (e.g., a retrieval control unit), a sensor unit 910, an interlocking mechanism controller 915, and a navigation unit 920. The control unit 905 of the retrieval control circuitry 900 can include one or more component or functionality of control unit 605 depicted in FIG. 6. The sensor unit 910 of the retrieval control circuitry 900 can include one or more component or functionality of sensor unit 610 depicted in FIG. 6. The navigation unit 920 of the retrieval control circuitry 900 can include one or more component or functionality of navigation unit 620 depicted in FIG. 6 of the control circuitry 600 of the underwater vehicle 290 shown in FIG. 2 used for deployment of sensor units 30. The control circuity 900 shown in FIG. 9 used for controlling the underwater vehicle 890 shown in FIG. 8 for retrieving sensor units 30 can include the interlocking mechanism controller 915 instead of the ramp controller 615.

The sensor unit 910 can be communicably connected to one or more sensors such as, for example, a visual or image sensor 925, an audio sensor 930, an accelerometer 935, sonar 940, radar 945, and a LIDAR 950. Lidar can refer to a detection system that works on the principle of radar, but uses light from a laser. Lidar can measure distance to a target by illuminating the target with pulsed laser light and measuring the reflected pulses with a sensor. The sensor unit 910, the control unit 905, the interlocking mechanism controller 915, and the navigation unit 920 can communicate over a communication bus 955 (e.g., bus 1505 depicted in FIG. 15).

The control circuitry 600 or 900 can include both the ramp controller 615 and the interlocking mechanism controller 915. For example, the associated underwater vehicle can have the combined capability to both deploy and to retrieve sensor units 30. In some such examples, both the ramp controller 615 and the interlocking mechanism controller 915 can be connected to the communication bus 655 or communication bus 955.

The interlocking mechanism controller 915 can control the operation of the interlocking mechanism (e.g., the first and second robotic arms 805 and 810 shown in FIG. 8) of the underwater vehicle 890. For example, the interlocking mechanism controller 915 can control the positions of the first and second robotic arms 805 and 810 for retrieval of seismic data acquisition units 30 from the seabed 55. In particular, the interlocking mechanism controller 915 can control the first and the second robotic arm into at least a first position in which the robotic arm retrieves the seismic data acquisition unit 30 from the seabed 55 and into at least a second position in which the robotic arm is disabled or retracted during travel between two deployment locations. The interlocking mechanism controller 915 can communicate with and/or include actuators (such as, for example, motors, solenoids, pumps, etc.) and sensors (such as, for example, proximity sensors, accelerometers, etc.).

Figure 10:
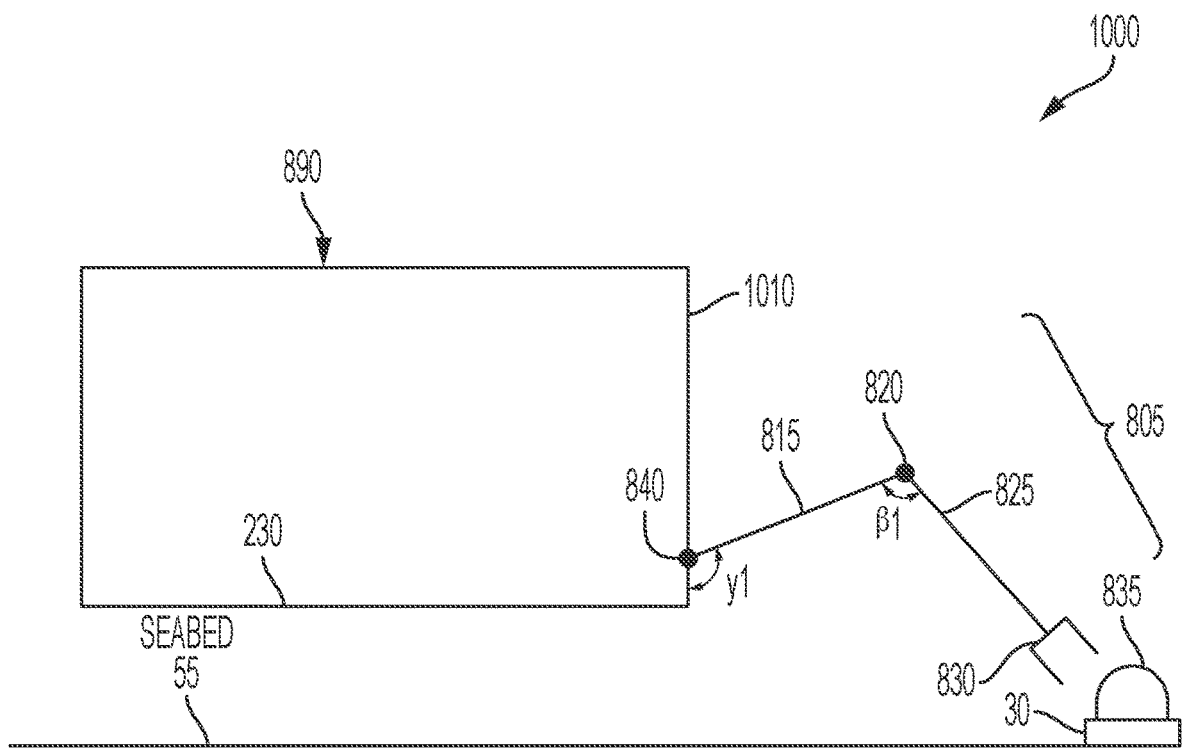
FIG. 10 illustrates a position of the underwater vehicle interlocking mechanism in accordance with an embodiment.
Figure 11:
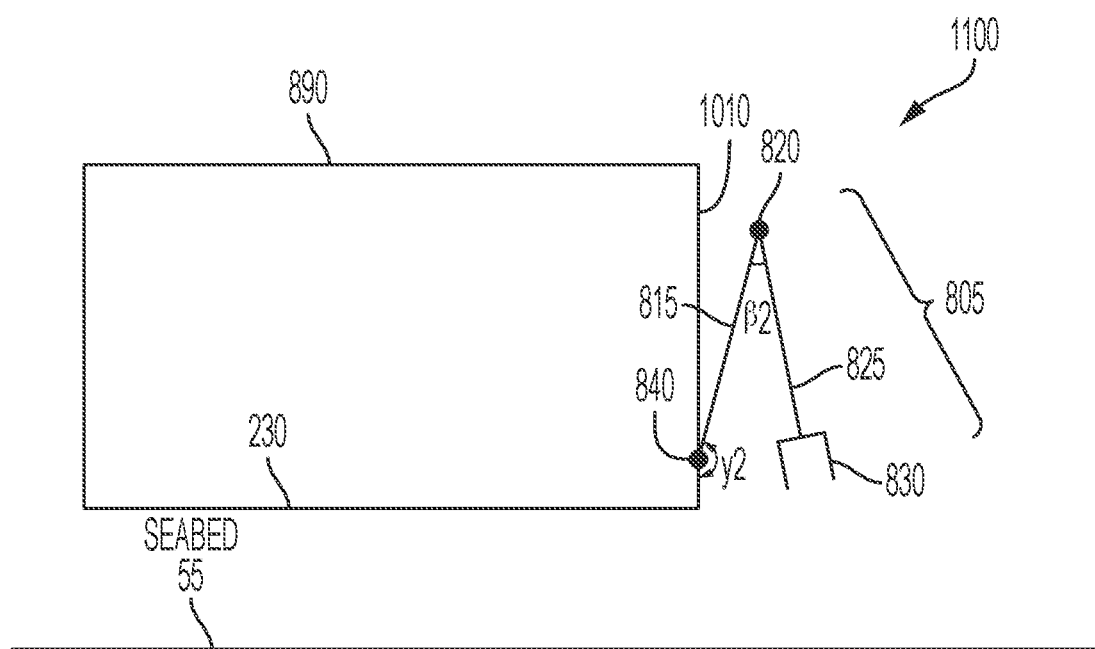
FIG. 11 illustrates a position of the underwater vehicle interlocking mechanism in accordance with an embodiment.

FIG. 10 and FIG. 11 illustrate positions of the underwater vehicle interlocking mechanism. In particular, FIG. 10 shows the first robotic arm 805 in a first position 1000, or a retrieval position 1000, while FIG. 11 shows the first robotic arm 805 in a second position 1100, or a retracted position 1100. Referring to FIG. 10, the control unit 905 shown in FIG. 9 can instruct the interlocking mechanism controller 915 to position the first robotic arm 805 in the first positon 1000 for retrieval of the seismic data acquisition unit 30. The seismic data acquisition unit 30 can include a seismic data acquisition unit interlocking mechanism 835 that can engage with the gripper portion 830 of the first robotic arm 805. As an example, the seismic data acquisition unit interlocking mechanism 835 can be a looped webbing, cable, or wire that can be grabbed by the gripper portion 830. In some examples, the seismic data acquisition unit interlocking mechanism 835 can include a clamp, a hook, or a magnet that can engage with a complementary interlocking mechanism of the underwater vehicle 890. In some examples, the seismic data acquisition unit interlocking mechanism 835 can have a positive buoyancy in the aqueous medium. For example, the seismic data acquisition unit interlocking mechanism 835 can include materials such as wood, fabric, polyester, plastics etc., that have a density that is less than the density of the aqueous medium.

The interlocking mechanism controller 915 can actuate a joint motor 840 that connects the first robotic arm 805 to the base 230 and an elbow portion 820, which connects the forearm portion 825 to the upper arm portion 815, such that the gripper portion 830 moves away from the base 230 and towards the position of the seismic data acquisition unit 30. In particular, the interlocking mechanism controller 915 can increase a first angle between the forearm portion 825 and the upper arm portion 815 to a value β1. The interlocking mechanism controller 915 may also increase a second angle between the upper arm portion 815 and a vertical surface 1010 (or vertical axis or reference) of or associated with the underwater vehicle 890 to a value γ2. By increasing the value of at least one of the first angle or the second angle, the gripper portion 830 of the first robotic arm 805 can be moved away from the base 230 and towards the seismic data acquisition unit 30. Further, the interlocking mechanism controller 915 can actuate the gripper portion 830 of the first robotic arm 805 to grab the seismic data acquisition unit interlocking mechanism 835.

FIG. 11 shows the robotic arm 805 in the second position 1100. The control unit 605 can instruct the interlocking mechanism controller 915 to set the first robotic arm 805 in the second position 1100, when, for example, the underwater vehicle 890 is traveling between the locations of two seismic data acquisition units 30, and to transfer the seismic data acquisition unit 30 to the storage compartment 235 after the seismic data acquisition unit 30 has been grabbed by the first robotic arm 805. Responsive to receiving the instruction to set the first robotic arm 805 to the second position 1100, the interlocking mechanism controller can actuate the joint motor 840 or the elbow portion 820 so that the first angle or the second angle are reduced such that the gripper portion 830 of the first robotic arm 805 is moved closer to the base 230. For example, the interlocking mechanism controller 915 can reduce the first angle to a value β2 (<β1) or the second angle to a value γ2 (<γ1), such that the first robotic arm 805 is retracted. In instances where the first robotic arm 805 is retrieving a seismic data acquisition unit 30 that is attached to the gripper portion 830, the interlocking mechanism controller 915 can retract the first robotic arm 805 such that the retrieved seismic data acquisition unit 30 can be appropriately positioned in the storage compartment. In instances where the underwater vehicle 890 is traveling between deployment locations of seismic data acquisition units 30, the interlocking mechanism controller 915 can retract the first robotic arm 805 such that it is at a safe distance from other components of the underwater vehicle 890 and from the seabed 55. Retracting the robotic arm 805 can facilitate reducing energy consumption by reducing the amount of drag force exerted on the underwater vehicle 890 as the underwater vehicle 890 travels between seismic data acquisition unit locations on the seabed. Thus, the robotic arm 805 can facilitate efficient fly-by or hovering retrieval of the seismic data acquisition unit 30 as well as improve the efficiency with which the underwater vehicle 890 travels between retrieval operations.

Figure 12:
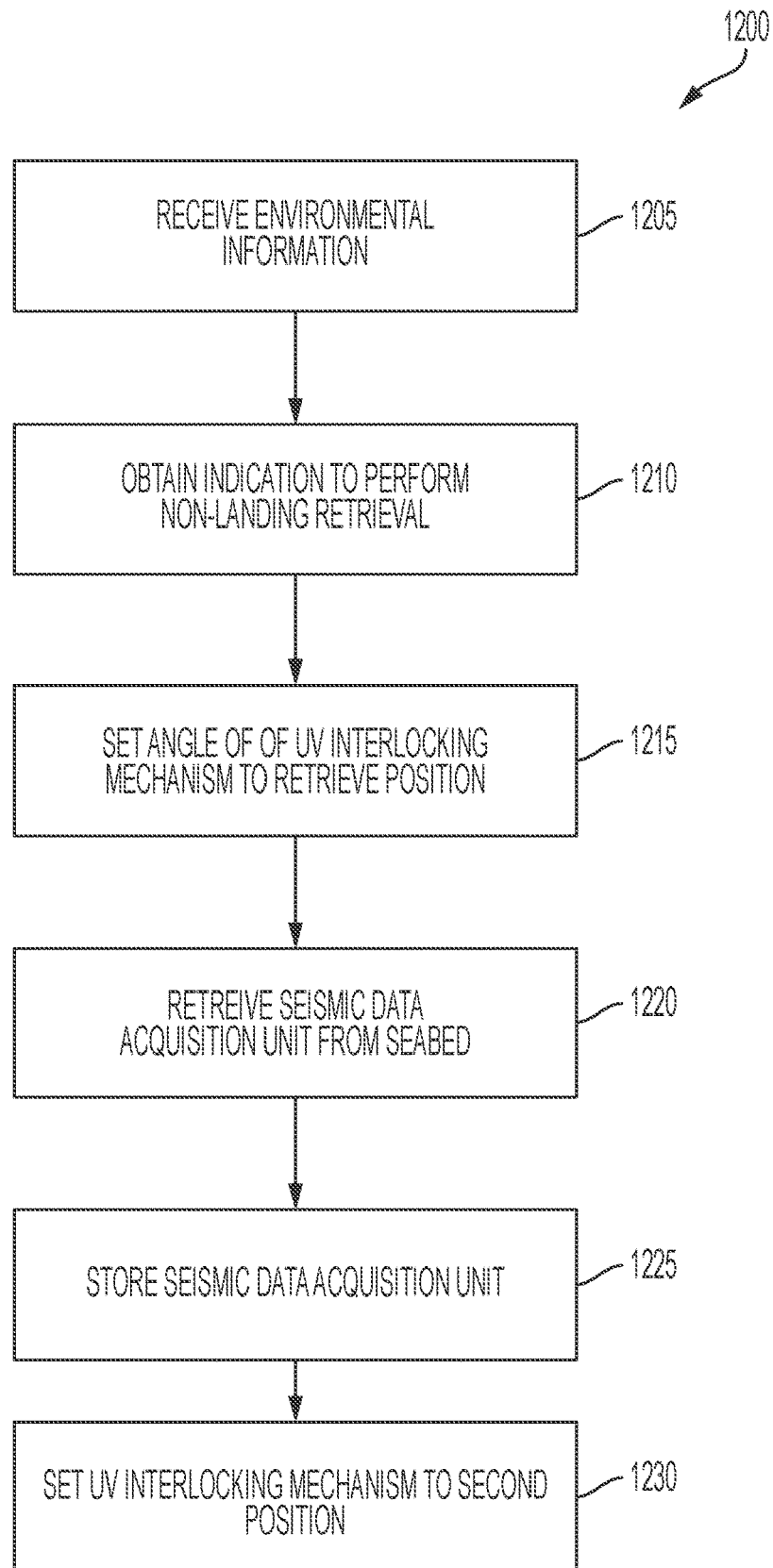
FIG. 12 depicts a flow diagram of a method for retrieving seismic data acquisition unit from an ocean bottom in accordance with an embodiment.

FIG. 12 depicts a flow diagram of a method 1200 for retrieving seismic data acquisition unit from an ocean bottom. The method 1200 can be executed by the control circuitry 900 shown in FIG. 9. The method 1200 includes receiving environmental information (ACT 1205). The control circuitry 900 can receive environmental information while the underwater vehicle 890 is underwater. In some examples, the environmental information can include values of environmental variables such as, for example, a velocity of the underwater vehicle 890, an elevation of the underwater vehicle 890 above the seabed, a turbidity of the aqueous medium in which the underwater vehicle 890 is travelling, a temperature of the aqueous medium, a topology of the ocean bottom, a composition of the ocean bottom, and a presence of marine life or growths. In some examples, the environmental information received by the control circuitry 900 can include acoustic information, such as, for example, acoustic signals responsive to transmission of an acoustic ping. The audio sensor can be used to capture the acoustic signals, and the control circuitry 900 can analyze the received acoustic signals to determine the presence of any obstacles, or the presence of seismic data acquisition units.

At least a portion of the environmental information can be determined by the control circuitry 900. For example, as shown in FIG. 9, the control circuitry 900 is communicably coupled to sensors such as a visual or image sensor 925, an audio sensor 930, an accelerometer 935, sonar 940, radar 945, and a lidar 950, and additional sensors such as a temperature sensor, pressure sensor, light meter, a photodiode, pH sensor, etc. The control circuitry 900 can use the data received from one or more of these sensors to determine the values of at least some of the environmental variables.

In some examples, at least a portion of the environmental information can be received by the control circuitry 900 from a surface vessel. In instances where the underwater vehicle 890 is not capable of measuring, or not in a position to measure, a value of a desired environmental variable, the value of the desired environmental variable can be received form a surface vessel, such as the surface vessel 5 shown in FIG. 1. In one example, the desired environmental variables can include speed and direction of the ocean currents, bathymetry of the seabed 55, etc. The surface vessel 5 can utilize one or more sensors communicably coupled to the surface vessel to measure the values of the desired environmental variables, and communicate the values to the underwater vehicle 890 via a tether and/or cable, such as the umbilical cable 44A and the tether 46A.

The method 1200 can include obtaining, based on the environmental information and a policy, an indication to perform a non-landing retrieval operation (ACT 1210). The non-landing retrieval operation can include moving the seismic data acquisition unit 30 from the seabed 55 to the storage container 235 without landing the underwater vehicle 890 on the seabed 55. The control circuitry can determine whether to perform the non-landing retrieval operation based, in part, on the environmental information received by the control unit 900. For example, the control circuitry 900 can use values of environmental variables such as velocity of the underwater vehicle 890 and the location of the underwater vehicle 890 to determine whether to perform fly-by deployment. The policy can specify one or more threshold values for the environmental variables. The control circuitry 900 can compare the received values of the environmental variables with the threshold values specified by the policy to determine whether to perform the non-landing retrieval operation. For example, the policy may specify that a non-landing retrieval operation may not be performed if the travel velocity of the underwater vehicle 890 is greater than 9 knots. The control circuitry 900 can compare the current travel velocity with the threshold value of 9 knots, and if the current travel velocity is less than 9 knots, the control circuitry 900 can determine that a non-landing retrieval of the seismic data acquisition units 30 can be performed. In one example, the policy can specify threshold values for additional factors such as, for example, speed and direction of the ocean currents, bathymetry of the seabed 55, etc.

In some examples, the control circuitry 900 can determine to perform the non-landing retrieval operation based on detecting an absence of marine life at the ocean bottom. The control circuitry 900 can utilize sensors such as, for example, image sensors and radar to determine whether any marine life is present in the vicinity of the underwater vehicle 890 or in the vicinity of the locations were the seismic data acquisition units 30 are deployed. The underwater vehicle 890 can use one or more image interpretation techniques to identify or detect marine life. Presence of marine life in the vicinity of the underwater vehicle 890 or in the vicinity of the seismic data acquisition units 30 can increase the risk of damage to both the marine life and the underwater vehicle 890. In such instances, the control circuity 900 may determine to abort the non-landing retrieval of the seismic data acquisition units 30. The control circuitry 900 can determine to slow the underwater vehicle 890 to a low travel velocity or a standstill and to perform the retrieval of the seismic data acquisition unit 30 in response to detecting marine life. For example, the control circuitry 900 can determine that risk to marine life can be minimized or eliminated by landing the underwater vehicle 900 or performing a hover over retrieval operation, as opposed to traveling at a greater velocity (e.g., 2 knots, 3 knots or more) while performing the retrieval operation. The control circuitry 900, upon detecting the absence of marine life at the ocean bottom, can determine that the non-landing retrieval of seismic data acquisition units can be performed.

In some examples, the control circuitry 900 can block the non-landing retrieval operation upon detection of an obstruction. An obstruction can include marine life, or other objects positioned on or over the sea bed. In some instances, the control circuitry 900 may block the non-landing retrieval operation only when the obstruction is detected along the path to the deployment location of the seismic data acquisition unit. In some examples, the control circuitry 900 can perform an emergency stopping method to stop the underwater vehicle 890. For example, the control unit 905 can instruct the navigation unit 920 to activate one or more reverse facing thrusters (e.g., propulsion system 270) to decelerate and stop the underwater vehicle 890.

In some examples, the control circuitry 900 can determine to perform the non-landing retrieval operation upon detecting that a current of the aqueous medium is below a threshold value. High magnitude ocean currents may affect the ability to control the operation of the underwater vehicle 890. Under such circumstances, retrieval of seismic data acquisition units may not be feasible or may accompany a high risk of decoupling with or damage to the seismic data acquisition unit 30. The control circuitry 900 can measure the current of the ocean in the vicinity of the underwater vehicle 890. The control circuitry 900 also may receive the measured current values from the surface vessel 5. The control circuitry 900 can compare the measure current with a threshold value provided by the policy. The control circuitry 900 may proceed to perform the non-landing retrieval operation only if the measured current values are less than the current threshold value.

In some examples, the control circuitry 900 can block the retrieval of a subsequent seismic data acquisition unit 30 if the visibility at the ocean bottom is below a visibility threshold value. For example, the control circuitry 900 can use one or more sensors coupled to the sensor unit 910 to measure the visibility in the vicinity of the underwater vehicle 890. The control circuity 900 can also store in memory a value of the visibility threshold based on the policy. The control circuitry 900 can compare the measured visibility with the visibility threshold, and block a non-landing retrieval operation of a subsequent seismic data acquisition unit 30 if the visibility is below visibility threshold. In some instances, where the control circuity 900 determines to block the non-landing retrieval operation, the control circuitry 900 can control the underwater vehicle 890 to instead perform a landing retrieval operation. For example, the control circuitry 900 can instruct the navigation unit 920 to land on the seabed 55 next to the seismic data acquisition unit 30 that is to be retrieved. The control circuitry 900 can then instruct the interlocking mechanism controller 915 to activate the first robotic arm 805 to retrieve and then store the seismic data acquisition unit 30 to the storage section 235.

The method 1200 further includes setting the underwater vehicle interlocking mechanism to a retrieve position (ACT 1215). For example, the control circuitry 900, responsive to the indication to perform a non-landing retrieval operation, and based on the location of an identified seismic data acquisition unit 30, can instruct the interlocking mechanism controller to set the position of the first robotic arm 805 to a first position 1000. The first positon 1000 of the first robotic arm 805 is the retrieval positon, in which the robotic arm 805 can retrieve the seismic data acquisition unit 30 from the seabed. In the retrieve position, the gripping portion 830 of the first robotic arm 805 is extended away from the base 230, and towards the seismic data acquisition unit 30 on the seabed 55.

In some examples, the control circuitry 900 can set the first robotic arm 805 to a first or retrieve position 805 by instructing the interlocking mechanism controller 915 to appropriately set the first angle between the forearm portion 825 and the upper arm portion 815 and/or set the second angle between the upper arm portion 815 and a vertical surface 1010 of the underwater vehicle 890, to appropriate values such that the seismic data acquisition unit 30 is within reach of the first robotic arm 805, as shown in FIG. 10.

In some examples, the control circuitry 900 can set the first and/or the second angle of the first robotic arm 805 based on environmental information and a location of an identified seismic data acquisition unit 30 on the seabed. The control circuitry 900 can determine a distance between the underwater vehicle 890 and the seismic data acquisition unit based on a previously known location of the seismic data acquisition unit 30 or based on real time detection using visual or other sensors coupled to the sensor unit 910. As shown in FIG. 10, the magnitude of the first and the second angles can determine the reach of the first robotic arm 805. The control circuity 900 can monitor the distance between the underwater vehicle 890 and the seismic data acquisition unit 30, and when the distance is less than the reach of the first robotic arm 805, the control circuitry 900 can instruct the interlocking mechanism controller 915 to set the first robotic arm 805 in the first or retrieve position.

The method 1200 also includes retrieving the seismic data acquisition unit 30 from the seabed (ACT 1220). For example, the control circuitry 900 can instruct the interlocking mechanism controller 915 to position and control the first robotic arm 805 such that the seismic data acquisition unit 30 on the seabed is coupled with the first robotic arm 805. The interlocking mechanism controller 915 can control the gripping portion 830 of the first robotic arm 805 such that the gripping portion 830 engages and couples with the seismic data acquisition unit interlocking mechanism 835 of the seismic data acquisition unit 30. The gripper portion 830 may include one or more hooks or gripping fingers, the relative positions of which can be controlled to either grip or release objects therebetween. The interlocking mechanism controller 915 can control the gripper portion 830 grip and lift the seismic data acquisition unit 30 from the seabed 55.

The method 1200 can include storing the seismic data acquisition unit in the storage container (ACT 1225). The control circuitry 900 can instruct the interlocking mechanism controller 915 to position the first robotic arm 805 such that the seismic data acquisition unit 30 retrieved from the seabed 55 is provided to the storage compartment or container 235. For example, the interlocking mechanism controller 915 can control the first robotic arm 805 such that the gripping portion 830 to which the seismic data acquisition unit 30 retrieved from the seabed 55 is coupled, is retracted from the first position 1000 to a position that allows the first robotic arm 805 to dispose the seismic data acquisition unit 30 over the storage compartment 235. The interlocking mechanism controller 915 can control the gripper portion 830 to release the seismic data acquisition unit 30 so that the seismic data acquisition unit 30 is stored in the storage compartment 235.

The method 1200 includes setting the underwater vehicle interlocking mechanism in a second position (ACT 1230). The control circuitry 900 can control the first robotic arm 805 such that the first robotic arm 805 is set in a second position to perform the non-landing retrieval operation for a second seismic data acquisition unit. For example, the control circuitry 900 can control the first robotic arm 805 such that the robotic arm is set in the second position 1100 shown in FIG. 11.

Figure 13:
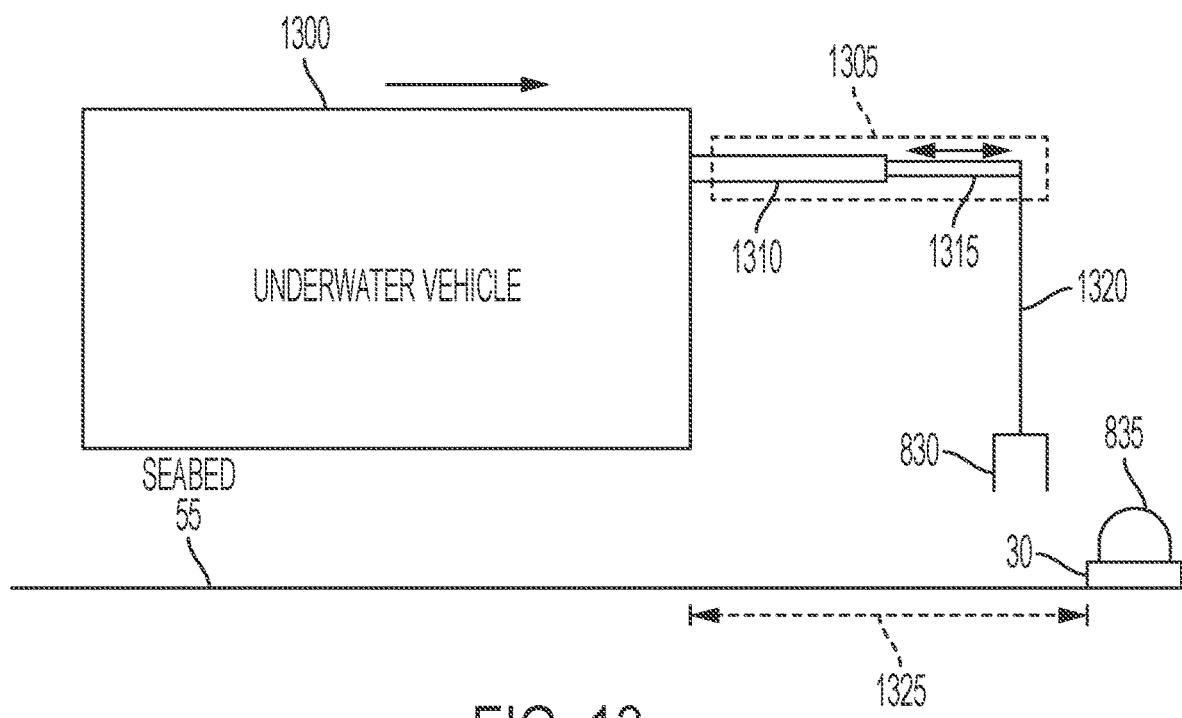
FIG. 13 shows another example underwater vehicle that can be utilized for non-landing retrieval of seismic data acquisition unit in accordance with an embodiment.

FIG. 13 illustrates another example underwater vehicle 1300 that can be utilized for non-landing retrieval of seismic data acquisition unit. The underwater vehicle 1300 can include one or more component or functionality of underwater vehicle 890 depicted in FIG. 8. The underwater vehicle 1300 shown in FIG. 13 can include a telescopic mechanism 1305 for capturing and retrieving the seismic data acquisition unit 30 from the seabed. The telescopic mechanism 1305 can allow for fly-by retrieval at a travel velocity greater than 0 knots while minimizing damage or disturbance to the seismic data acquisition unit 30 or the seabed 55. By providing the telescopic mechanism 1305, the underwater vehicle 1300 of the present technical solution can continue moving at a first travel velocity while the gripper 830 appears to be stationary or moving at a second travel velocity less than the first travel velocity relative to the seismic data acquisition unit 30 located on the seabed 30.

The telescopic mechanism 1305 can include at least an outer stationary member 1310 and an inner member moveable member 1315. The inner moveable member 1315 is partially positioned within the outer stationary member 1310 and can be configured to at least partially move in and out of the outer stationary member 1310. An end of the inner moveable member 1315 can be coupled to an arm member 1320 a distal end of which is coupled to a gripper portion 830. During a non-landing retrieving operation, the control circuitry 900 can navigate the underwater vehicle 1300 towards the location of the seismic data acquisition unit 30 for retrieving the seismic data acquisition unit 30 from the seabed 55. In the process of approaching the seismic data acquisition unit 30, the control circuitry 900 can detect a distance 1325 of the underwater vehicle 1300 from the seismic data acquisition unit 30. The control circuity 900 can compare the measured distance with a first threshold distance. As an example, the threshold distance can represent a horizontal reach of the gripper portion 830. Upon detecting that the measured distance 1325 is less than the first threshold distance, the control circuitry 900 can instruct the interlocking mechanism controller 915 to control the telescopic mechanism 1305 such that the inner moveable member 1315 is extended out of the outer stationary member 1310. The interlocking mechanism controller 915 can continue to extend the inner moveable member 1315 until the gripper portion 830 engages and couples with the seismic data acquisition unit interlocking mechanism 835. The interlocking mechanism controller 915 can then control the gripper portion 830 to lift the seismic data acquisition unit 30 from the seabed 55 and control the inner moveable member 1315 to retract into the outer stationary member 1310 to an extent that allows the gripper portion 830 to position and dispose the seismic data acquisition unit 30 in the storage compartment 235.

In some instances, the gripper portion 830 can be implemented using a suction device. The suction device can be coupled to an air flow pump that sucks air from an opening in the suction device. When the suction device is positioned over the seismic data acquisition unit 30, the seismic data acquisition unit 30 can be sucked towards and adhere to the suction device. In some such instances, the interlocking mechanism controller 915 can control the telescopic mechanism 1305 such that the inner moveable member 1315 is extended out before the underwater vehicle 1300 approaches the seismic data acquisition unit 30. When the underwater vehicle 1300 is close enough to the seismic data acquisition unit 30 such that the suction device attached to the arm portion 1320 is directly above the seismic data acquisition unit 30, the control circuitry 900 can lower the arm portion and activate the suction device. In addition, the control circuitry 900 can begin retracting the inner moveable member 1315 as the underwater vehicle 1300 moves towards the seismic data acquisition unit 30, such that the suction device is maintained in contact with the seismic data acquisition unit 30. This provides the suction device enough time to securely adhere to the seismic data acquisition unit 30. Once the seismic data acquisition unit 30 is securely adhered to the suction device, the control circuitry 900 can retract the arm portion 1320 such that the seismic data acquisition unit 30 is lifted form the seabed 55. In some instances, the control circuitry 900 can continue to measure the distance between the underwater vehicle 1300 and the seismic data acquisition unit 30 while the suction device is being activated. If the control circuitry 900 detects that the seismic data acquisition unit 30 is not securely coupled to the suction device by a second threshold distance (less than the first threshold distance), the control circuitry 900 can determine that the seismic data acquisition unit 30 cannot be securely lifted off of the seabed while still maintaining the forward motion of the underwater vehicle 1300. Upon this determination, the control circuitry 900 can deactivate the suction device, and move on to retrieve another seismic data acquisition unit 30 or turn back and try to retrieve the same seismic data acquisition unit 30 again.

Figure 14:
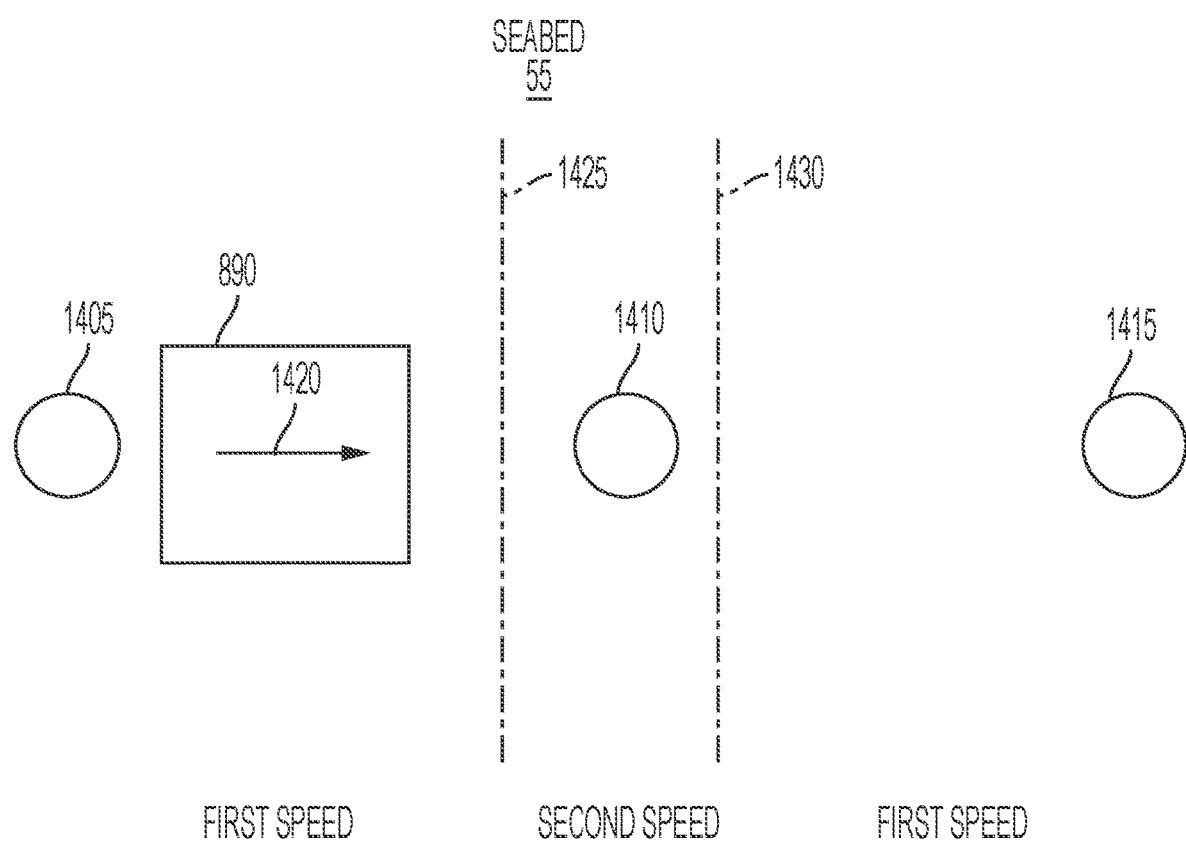
FIG. 14 depicts an example mechanism for a non-landing retrieval operation in accordance with an embodiment.

FIG. 14 depicts an example mechanism for a non-landing retrieval operation. In particular, FIG. 14 shows a top view of the underwater vehicle 890 travelling over the seabed 55. The underwater vehicle 890 can move in the direction 1420 subsequent to retrieving a first seismic data acquisition unit 1405 (e.g., a seismic data acquisition unit 30) and move towards a second seismic data acquisition unit 1410 (e.g., a seismic data acquisition unit 30) and a third seismic data acquisition unit 1415 (e.g., a seismic data acquisition unit 30). Subsequent to retrieving the first seismic data acquisition unit 1405 the control circuitry 900 can control the underwater vehicle 890 to travel at a first speed. While traveling in the direction 1420, the control circuitry 900 can continue to detect the location of the second seismic data acquisition unit 1410. The first location 1425 can indicate a location in relation to the second seismic data acquisition unit 1410 where the control circuitry 900 positively identifies the location of the second seismic data acquisition unit 1410. Once the control circuitry 900 identifies the second seismic data acquisition unit 1410, the control circuitry 900 can initiate a reduction in the speed of the underwater vehicle 890 to a second speed. In some examples, the second speed can be a non-zero speed. The control circuit 900 can reduce the speed of the underwater vehicle 890 to reduce the risk of not being able to successfully couple to, and retrieve, the second seismic data acquisition unit 1410. The control circuit 900 can reduce the speed to the second speed to reduce the risk of damage or disturbance to the seismic data acquisition unit 1410 or the seabed 55. For example, disturbance to the seabed 55 can cause dirt or debris to be expelled from the seabed 55 and increase the turbidity of the water. Disturbance to the seismic data acquisition unit 1410 can cause damage the outer casing or internal components of the seismic data acquisition unit 1410, thereby reducing the longevity of the unit 1410 or causing loss of seismic data stored on the unit 1410. Thus, by moving at a second speed less than the first speed, the underwater vehicle 890 can reduce or eliminate the risk of damage or disturbance to a seismic data acquisition unit or seabed, while improving efficiencies in the retrieval operation by reducing energy or other resource usage and the duration of the retrieval operation, relative to stopping and landing on the seabed in order to retrieve the unit 1410. Further, when, the underwater vehicle 890 lands on the seabed 55 to retrieve the unit 1410, debris to be expelled. Thus, a hover-over retrieval operation can provide technical improvements relative to a landing retrieval.

The control circuitry 900 can then control underwater vehicle 890 to retrieve the second seismic data acquisition unit 1410. Subsequent to retrieval of the second seismic data acquisition unit 1410, the control circuitry 900 can initiate an increase in the speed of the underwater vehicle 890 back to the first speed. For example, the control circuitry 900 can wait until it reaches a second location 1430 before it initiates the increase in the speed back to the first speed. In some instances, the distance of the second location 1430 from the location of the second seismic data acquisition unit 1410 can be less than the distance between the first location 1425 and the location of the second seismic data acquisition unit 1410.

In some examples, both the fly-by deployment features discussed above in relation to FIGS. 1-7, and the non-landing retrieval feature discussed above in relation to FIGS. 1, 8-14 can be combined into a single underwater vehicle. For example, an underwater vehicle can include both the ramp 220 for deployment of seismic data acquisition units as well as the interlocking mechanism to retrieve deployed seismic data acquisition units. Similarly, a control circuitry for such a combined underwater vehicle can include the units of both the control circuitry 600 shown in FIG. 6 and the control circuitry 900 shown in FIG. 9.

Figure 15:
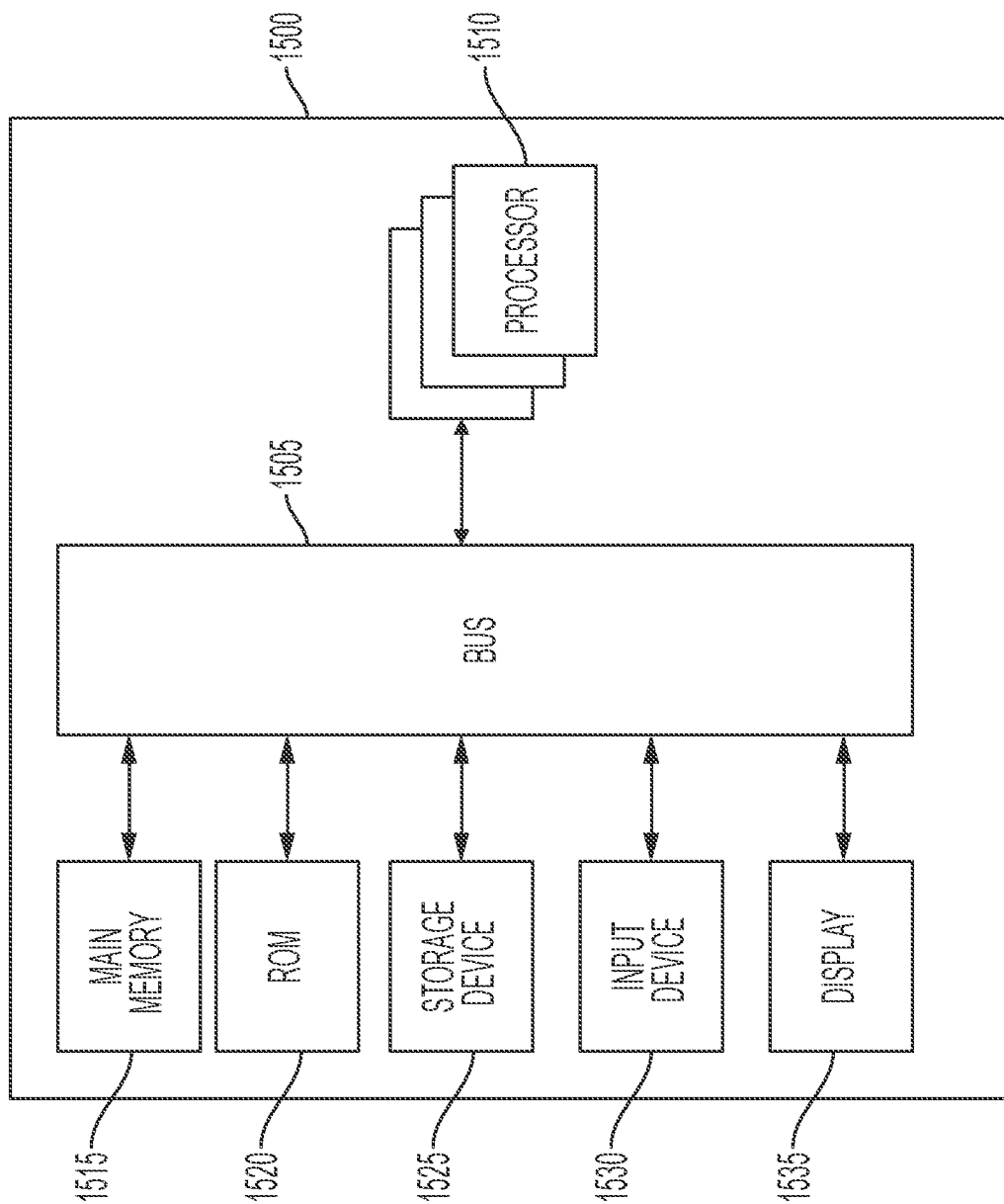
FIG. 15 is a block diagram illustrating a general architecture for a computer system that can be employed to implement various elements of the embodiments shown in FIGS. 1-14.

FIG. 15 is a block diagram of a computer system 1500 in accordance with an embodiment. The computer system or computing device 1500 can be used to implement one or more controller, sensor, interface or remote control of system 200, system 300, system 400, system 500, system 600, method 700, system 800, system 900, system 1000, system 1100, method 1200, system 1300, and system 1400. The computing system 1500 includes a bus 1505 or other communication component for communicating information and a processor 1510a-n or processing circuit coupled to the bus 1505 for processing information. The computing system 1500 can also include one or more processors 1510 or processing circuits coupled to the bus for processing information. The computing system 1500 also includes main memory 1515, such as a random access memory (RAM) or other dynamic storage device, coupled to the bus 1505 for storing information, and instructions to be executed by the processor 1510. Main memory 1515 can also be used for storing seismic data, binning function data, images, reports, tuning parameters, executable code, temporary variables, or other intermediate information during execution of instructions by the processor 1510. The computing system 1500 may further include a read only memory (ROM) 1520 or other static storage device coupled to the bus 1505 for storing static information and instructions for the processor 1510. A storage device 1525, such as a solid state device, magnetic disk or optical disk, is coupled to the bus 1505 for persistently storing information and instructions.

The computing system 1500 may be coupled via the bus 1505 to a display 1535 or display device, such as a liquid crystal display, or active matrix display, for displaying information to a user. An input device 1530, such as a keyboard including alphanumeric and other keys, may be coupled to the bus 1505 for communicating information and command selections to the processor 1510. The input device 1530 can include a touch screen display 1535. The input device 1530 can also include a cursor control, such as a mouse, a trackball, or cursor direction keys, for communicating direction information and command selections to the processor 1510 and for controlling cursor movement on the display 1535.

The processes, systems and methods described herein can be implemented by the computing system 1500 in response to the processor 1510 executing an arrangement of instructions contained in main memory 1515. Such instructions can be read into main memory 1515 from another computer-readable medium, such as the storage device 1525. Execution of the arrangement of instructions contained in main memory 1515 causes the computing system 1500 to perform the illustrative processes described herein. One or more processors in a multi-processing arrangement may also be employed to execute the instructions contained in main memory 1515. In some embodiments, hard-wired circuitry may be used in place of or in combination with software instructions to effect illustrative implementations. Thus, embodiments are not limited to any specific combination of hardware circuitry and software.

Although an example computing system has been described in FIG. 15, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display)

monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While various inventive embodiments have been described and illustrated herein, those of ordinary skill in the art will readily envision a variety of other means or structures for performing the function or obtaining the results or one or more of the advantages described herein, and each of such variations or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, or configurations will depend upon the specific application or applications for which the inventive teachings are used. The foregoing embodiments are presented by way of example, and within the scope of the appended claims and equivalents thereto other embodiments may be practiced otherwise than as specifically described and claimed. The systems and methods described herein are directed to each individual feature, system, article, material, or kit, described herein. In addition, any combination of two or more such features, systems, articles, materials, kits, or methods, if such features, systems, articles, materials, kits, or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Generally, program modules include routines, programs, objects, components, data structures, or other components that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." References to "or" may be construed as inclusive so that any terms described using "or" may indicate any of a single, more than one, and all of the described terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B,") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A method of retrieving seismic data acquisition units from an underwater seismic survey, comprising:
   providing, in an aqueous medium, an underwater vehicle comprising a base and an underwater vehicle interlocking mechanism coupled with the base;
   receiving, by the underwater vehicle located in the aqueous medium, environmental information;
   identifying, by the underwater vehicle, a seismic data acquisition unit located on an ocean bottom, the seismic data acquisition unit having a seismic data acquisition unit interlocking mechanism, the seismic data acquisition unit interlocking mechanism complimentary to the underwater vehicle interlocking mechanism;
   obtaining, by the underwater vehicle based on the environmental information and a policy, an indication to perform a non-landing retrieval operation comprising moving, without landing the underwater vehicle on the ocean bottom, seismic data acquisition units from the ocean bottom to a storage container, the seismic data acquisition units storing seismic data indicative of subsurface lithological formations or hydrocarbons;
   setting, responsive to the indication to perform the non-landing retrieval operation and based on the environmental information and a location of the identified seismic data acquisition unit, a position of the underwater vehicle interlocking mechanism to extend away from the base of the underwater vehicle;
   retrieving, by the underwater vehicle in performance of the non-landing retrieval operation, the seismic data acquisition unit by extending the underwater vehicle interlocking mechanism away from the base and coupling the underwater vehicle interlocking mechanism with the seismic data acquisition unit interlocking mechanism;
   storing, by the underwater vehicle, the seismic data acquisition unit in the storage container; and
   setting, by the underwater vehicle, the underwater vehicle interlocking mechanism in a second position to perform the non-landing retrieval operation for a second seismic data acquisition unit.

2. The method of claim 1, wherein the underwater vehicle comprises a remote operated vehicle tethered to a vessel.

3. The method of claim 1, wherein the underwater vehicle comprises an autonomous underwater vehicle absent a tether to a vessel.

4. The method of claim 1, comprising:
   determining, by a control unit external and remote from the underwater vehicle, to perform the non-landing retrieval operation; and
   transmitting, by the control unit, the indication to the underwater vehicle.

5. The method of claim 1, comprising:
   retrieving, by the underwater vehicle, the seismic data acquisition unit by coupling the seismic data acquisition unit interlocking mechanism with the underwater vehicle interlocking mechanism of the seismic data acquisition unit the while hovering over the ocean bottom.

6. The method of claim 1, wherein the environmental information comprises at least one of a velocity of the underwater vehicle, an elevation of the underwater vehicle, a turbidity of the aqueous medium, a current of the aqueous medium, a temperature of the aqueous medium, a topography of the ocean bottom, a composition of the ocean bottom, or a presence of marine life or growths.

7. The method of claim 1, comprising:
   receiving the environmental information via one or more sensors comprising at least one of a visual sensor, an audio sensor, an accelerometer, sonar, radar, or lidar.

8. The method of claim 1, comprising:
   determining to perform the non-landing retrieval operation responsive to detecting an absence of marine life at the ocean bottom.

9. The method of claim 1, comprising:
   determining, for the seismic data acquisition unit, to perform the non-landing retrieval operation responsive to detecting a current of the aqueous medium below a current threshold;
   blocking, for a third seismic data acquisition unit, the non-landing retrieval operation responsive to detecting a level of visibility below a visibility threshold; and
   landing, by the underwater vehicle responsive to the blocking of the non-landing retrieval operation, on the ocean bottom to retrieve the third seismic data acquisition unit.

10. The method of claim 1, comprising:
blocking, for a third seismic data acquisition unit, the non-landing retrieval operation responsive to detection of an obstruction; and
performing, by the underwater vehicle, an emergency stopping process using multiple reverse facing thrusters.

11. The method of claim 1, wherein the underwater vehicle comprises a robotic arm coupled to the seismic data acquisition unit interlocking mechanism, comprising:
setting an angle of the robotic arm to position the seismic data acquisition unit interlocking mechanism to retrieve the seismic data acquisition unit based on the environmental information and the location of the identified seismic data acquisition unit.

12. The method of claim 1, wherein the underwater vehicle interlocking mechanism has a positive buoyancy in the aqueous medium.

13. The method of claim 1, comprising:
detecting that the underwater vehicle is within a threshold distance from the seismic data acquisition unit; and
extending, by a telescoping mechanism of the seismic data acquisition unit responsive to the detecting that the underwater vehicle is within the threshold distance from the seismic data acquisition unit, the underwater vehicle interlocking mechanism towards the seismic data acquisition unit interlocking mechanism of the underwater vehicle.

14. The method of claim 1, comprising:
detecting that the underwater vehicle is within a threshold distance from the seismic data acquisition unit;
activating the underwater vehicle interlocking mechanism to couple with the seismic data acquisition unit interlocking mechanism; and
subsequent to retrieval of the seismic data acquisition unit by the underwater vehicle, deactivate the underwater vehicle interlocking mechanism.

15. The method of claim 1, comprising:
determining the location of the seismic data acquisition unit using an acoustic beacon.

16. The method of claim 1, wherein:
the underwater vehicle interlocking mechanism is mechanically decoupled from the seismic data acquisition unit; and
the seismic data acquisition unit interlocking mechanism comprises at least one of a hook or a clamp.

17. The method of claim 1, comprising:
identifying, by the underwater vehicle, an object on the ocean bottom; and
determining, based on a seismic data acquisition unit detection policy, not to retrieve the object.

18. The method of claim 1, comprising:
subsequent to retrieving the seismic data acquisition unit, traveling, by the underwater vehicle, at a first speed;
identifying, by the underwater vehicle, the second seismic data acquisition unit on the ocean bottom;
reducing, by the underwater vehicle prior to retrieval of the second seismic data acquisition unit, a speed of the underwater vehicle to a second speed; and
subsequent to retrieving the second seismic data acquisition unit, traveling, by the underwater vehicle, at the first speed, the first speed greater than the second speed.

19. A system to retrieve seismic data acquisition units from an underwater seismic survey, comprising:
an underwater vehicle located in an aqueous medium, the underwater vehicle comprising:
a base;
an underwater vehicle interlocking mechanism coupled with the base;
one or more sensors to determine environmental information; and
a retrieval control unit executed by one or more processors to:
identify a seismic data acquisition unit located on an ocean bottom, the seismic data acquisition unit coupled with a seismic data acquisition unit interlocking mechanism, the seismic data acquisition unit interlocking mechanism complimentary to the underwater vehicle interlocking mechanism;
obtain, based on the environmental information and a policy, an indication to perform a non-landing retrieval operation comprising movement, without landing the underwater vehicle on the ocean bottom, seismic data acquisition units from the ocean bottom to a storage container, the seismic data acquisition units storing seismic data indicative of subsurface lithological formations or hydrocarbons;
set, responsive to the indication to perform the non-landing retrieval operation and based on the environmental information and a location of the identified seismic data acquisition unit, a position of the underwater vehicle interlocking mechanism to extend away from the base of the underwater vehicle;
extend the underwater vehicle interlocking mechanism away from the base;
couple, in performance of the non-landing retrieval operation, the underwater vehicle interlocking mechanism with the seismic data acquisition unit interlocking mechanism to retrieve the seismic data acquisition unit;
store the seismic data acquisition unit in the storage container; and
set the underwater vehicle interlocking mechanism in a second position to perform the non-landing retrieval operation for a second seismic data acquisition unit.

20. The system of claim 19, comprising:
the underwater vehicle to hover over the ocean bottom and couple the seismic data acquisition unit interlocking mechanism with the underwater vehicle interlocking mechanism of the seismic data acquisition unit to retrieve the seismic data acquisition unit.

* * * * *